United States Patent
Adusumilli

[19]
[11] Patent Number: 5,870,749
[45] Date of Patent: Feb. 9, 1999

[54] AUTOMATIC TRANSLATION BETWEEN CMIP PDUS AND CUSTOM DATA STRUCTURES

[75] Inventor: Panduranga Rao Adusumilli, Edison, N.J.

[73] Assignee: DSET Corporation, Bridgewater, N.J.

[21] Appl. No.: 772,142

[22] Filed: Dec. 19, 1996

[51] Int. Cl.⁶ .................................................. G06F 17/30
[52] U.S. Cl. ........................................ 707/101; 395/705
[58] Field of Search ........................... 1/1; 395/500, 705; 707/103, 1–10, 100–104, 200–206; 370/249, 465; 364/280.4, 283.4, 281.3, 282.1, 282.2, 283.3

[56] References Cited

U.S. PATENT DOCUMENTS

| | | | |
|---|---|---|---|
| 4,994,998 | 2/1991 | Anezaki | 364/900 |
| 5,291,583 | 3/1994 | Bapat | 395/500 |
| 5,295,256 | 3/1994 | Bapat | 395/500 |
| 5,315,709 | 5/1994 | Alston, Jr. et al. | 707/6 |
| 5,519,868 | 5/1996 | Allen et al. | 395/705 |
| 5,608,720 | 3/1997 | Biegel et al. | 370/249 |
| 5,632,035 | 5/1997 | Goodwin | 395/705 |
| 5,704,041 | 12/1997 | Allen et al. | 1/1 |

*Primary Examiner*—Thomas G. Black
*Assistant Examiner*—Ruay Lian Ho
*Attorney, Agent, or Firm*—Buchanan Ingersoll, P.C.

[57] ABSTRACT

A method for translating attribute data carried in Common Management Information Protocol (CMIP) Protocol Data Units (PDUs) to/from custom designed data structures. A supplementary method for incorporating user's preferences on the data structures and the relationships between different fields in these data structures and the corresponding attribute values is also provided. The translation method automatically performs conversions between the user-designed data structures and various CMIP requests/responses automatically, and, in accordance with user's preferences. The method allows users to simplify and/or compact the storage representation of the Managed Objects by taking advantage of application specific knowledge, and by eliminating unnecessary fields from CHOICE data types in the target data structures. Benefits of the methods presented in this disclosure include automatic translation of CMIP PDUs to/from user-designed data structures, ability to store Managed Object data in space-efficient manner, and automatic generation of data structures for use in communicating with devices using proprietary data representation.

13 Claims, 29 Drawing Sheets

System Diagram

AUTOMATIC TRANSLATION BETWEEN CMIP PDUS AND CUSTOM DATA STRUCTURES

BACKGROUND

1. Field of Invention

This invention relates to a technique and translator for translating attribute-data carried in various CMIP PDUs into user-designed data structures. Typically one data structure is used to represent the attribute-data of an instance of a Managed Object class defined using GDMO specifications. The ability to store data in user-designed structures, as opposed to some mechanically generated structures is useful for a variety of purposes (simpler data representation, compact storage, easier integration with other applications, etc.) in implementing Telecommunications Management Network (TMN) applications.

2. Background of the Invention

The GDMO information modeling and the CMIP protocol provide a very powerful and generic framework for implementing OSI systems management. However, the power and generality of this framework has a high cost in terms of the complexity involved in the implementation of Systems Management applications based on the CMIP protocol.

There are at least four methods that may be of some use in implementing CMIP protocol based management applications.

Anezaki describes a method in U.S. Pat. No. 4,994,948 for automatically generating C structures by parsing ASN.1 definitions. This method does not provide any mechanism for the users to customize the C structures, and also does not have any special support for the semantics of CMIP PDUs and GDMO constructs.

Bapat describes a translator in U.S. Pat. No. 5,295,256 for translating objects defined using ASN.1 and GDMO constructs into a relational database schema for persistent storage. This method also performs mechanical translations, without allowing users to customize the data representation. This method also does not have any special support for the translation of CMIP PDUs to/from target data representation.

X/Open CAE Specification C502 describes a method for translating objects defined using ASN.1 and GDMO constructs into C data structures; these C structures are mechanically generated, without allowing the user to define the target data structures.

X/Open CAE Specification C306 defines an Application Programming Interface for accessing the CMIP PDU data that is translated according to mechanical mapping schemes described in X/Open CAE Specification C502. This method also does not provide any direct support for users to define the target data structures for representing the Managed Object data and performing automatic translations between CMIP PDUs and the user data structures. With this method, such translations should be performed completely by user-written code.

All of the above approaches retain the complexity of data representation, and leave it to the users to implement the mapping between the attribute data in CMIP PDUs to application-specific data structures. However, because of the need to handle a large number of Managed Object (MO) classes, attributes, ASN.1 types and different types of CMIP PDUs, it becomes a tedious and error-prone process to implement translations for all resulting permutations and combinations. Consequently, there is a need for a simple, reliable method to make these translations.

SUMMARY OF THE INVENTION

It is an object of the present invention to automate the above process by providing direct translation mechanisms between CMIP data and user-designed data structures, and to allow simplification of the data structures. Simplification of data representation is achieved by several means, including, allowing user to choose any data type to represent an attribute value which can significantly simplify the data representation when it is coupled with application specific knowledge, providing means to remove unnecessary CHOICE members, providing means to remove unnecessary attributes from being represented in the data structure, and, allowing usage of fixed-length arrays to represent variable-length ASN.1 "SET OF" or "SEQUENCE OF" types.

The process also supports representation of Managed Object attribute data in a space-efficient manner or in a form suitable for efficient database access by CMIP a well as non-CMIP applications. Carefully designed user's data structures, as opposed to generic internal representations used in the above mentioned traditional approaches, can result in such efficient representations.

It is another objective to simplify the representation of Managed Object attribute-data by providing a configuration mechanism to remove unused CHOICE member fields in ASN.1 types, unused attributes from data structures.

It is another objective to provide a configuration mechanism that allows the users to specify to the system what data structures are to be used for representing Managed Object data for different Managed Object classes.

It is another objective to generate an initial configuration file based on GDMO and ASN.1 meta data that the user can modify to specify his/her own translation mechanisms and the data structures to be used for representing different ASN.1 types and GDMO attributes.

It is another objective to provide a mechanism to propagate the configuration information provided for some Managed Object classes and ASN.1 types to other Managed Object Classes and attributes that use them.

For the purpose of describing the invention, the user-designed data structures are assumed to be C structures. However, the methods of this invention can be implemented in other general purpose languages, and hence this invention should not be restricted to the C language implementation.

I provide a method for translating CMIP PDUs to/from custom designed data structures, and a second method for specifying the relationship between different fields in the custom data structures and the attribute data carried in the CMIP PDUs. The second method includes mechanisms to generate initial configuration files and for propagating configuration information of some GDMO and ASN.1 constructs to other GDMO constructs that use them, thereby minimizing the configuration effort. The translation tables generated by the second method are used by the first method for performing automatic translations between the attribute data carried in CMIP PDUs and the corresponding fields in user-designed data structures.

The benefits of the system include the ability to translate CMIP data to or from user-designed data structures without writing CMIP Request/Response-specific or Managed Object Class-specific code, simplification of data representation by allowing user to specify the data structures to be used for representing CMIP, GDMO and ASN.1 data, efficient data representation in memory by allowing the user to specify the data structures taking advantage of application specific knowledge, and providing efficient database access to CMIP as well as non-CMIP applications by using customized data structures to represent Managed Object attribute data.

The present preferred embodiment consists of two components: an incremental configuration program that allows users to easily specify the data types to be used for representing Managed Object data, and a translator library module providing translation code for converting data between various CMIP PDUs and the Managed Object Class specific data structures, using the translation tables generated by the configuration program.

Both these components use the meta data generated by ASN.1 and GDMO compilers. Such compilers are well known to those skilled in the art and are described in the DSET ASN.C Programmer's Reference Manual and the DSET GDMO Compiler Reference Manual, respectively.

In the present preferred embodiments I generate an initial configuration file, generate translation tables, translate attribute data from a CMIP Request/Response PDU into a user designated data structure, and translate attribute data from user-designated C structure to a CMIP Request/Response PDU.

According to the present invention, a method for generating an initial configuration file from the ASN.1 and GDMO meta data includes the steps of creating an entry in the Managed Object Class table (MOClassTable) for each Managed Object Class that is of interest to the user, creating a Class Attribute Table for each entry in the MOClassTable (referred to as ClassAttributeTable) which includes entries for attributes belonging to this class (or derived from super classes), creating an entry for each used attribute with a primitive ASN.1 type as its syntax, in the Global Attribute Table (referred to as GlobalAttributeTable), creating an entry in the ASN.1 Type Table (referred to as ASN1TypeTable) for each complex ASN.1 type that is used as syntax for a used attribute, generating unique localForm identifiers for each entry in the MOClassTable (referred to as localFormClassId) and for each entry in the GlobalAttributeTable (referred to as localFormAttributeId), generating default CLASS specification for each class in MOClassTable, generating default ATTRIBUTE specification for each attribute in the GlobalAttributeTable, and generating default TYPE specification for each ASN.1 type in the ASN1TypeTable.

A method for generating translation tables includes the steps of parsing the input configuration file and building the MOClassTable and ClassAttributeTable using the CLASS specifications in the configuration file, building the GlobalAttributeTable using the ATTRIBUTE specifications in the configuration file, and building the ASN1TypeTable using the TYPE specifications in the configuration file, propagating the configuration information for not yet configured Managed Object Classes by copying the configuration information from their super classes, propagating the ASN.1 Type configuration to attributes that have complex syntax, but not yet configured, and generation of translation tables (MOClassTable, ClassAttributeTables, GlobalAttributeTable, and ASN1TypeTable) containing this information in a form convenient for usage by the translator library module.

A method for translating attribute-data from a CMIP Request/Response PDU (GET, GET-RESPONSE, SET, SET-CONFIRMED, SET-RESPONSE, CREATE, CREATE-RESPONSE, EVENT-REPORT) into a user-designed data structure includes the steps of finding the appropriate MOClassTable entry based on ManagedObjectClass field of the Request/Response PDU (eventType information in case of EVENT-REPORT), finding the ClassAttributeTable entry for each attribute referenced in the Request/Response PDU and turning on the corresponding bit in the bit_mask field of the data structure, and translating the attribute-value (not applicable for GET request) to user chosen data type for this attribute using the user-specified ASN-to-C conversion function, if any, or by using default translation methods, and, copying the translated attribute-value into the C structure at a position given by the fieldOffset field in the ClassAttributeTable entry.

A method for translating attribute data from user-designed C structure to a CMIP Request/Response PDU (GET, GET-RESPONSE, SET, SET-CONFIRMED, SET-RESPONSE, CREATE, CREATE-RESPONSE, EVENT-REPORT) includes the steps of finding the appropriate MOClassTable entry based on the Managed Object Class information passed to the translation API (eventType information in case of EVENT-REPORT), fetching the ClassAttributeTable entry for each attribute whose bit in the bit_mask field of the input C structure is set (the bit-position in the bit_mask corresponds to the table-index in the ClassAttributeTable entry), adding an element to the attribute-list of the CMIP Request/Response PDU, and setting the attributeId field, translating the attribute-value (not applicable for GET request) present in the input C structure at an offset given by the fieldOffset field in the ClassAttributeTable using the user-specified C-to-ASN conversion function, if any, or by using the default translation methods, and setting the attribute-value field of the corresponding element in the attribute-list of the CMIP Request/Response PDU.

The invention is best understood by referring to the attached figures and the following detailed description.

DETAILED DESCRIPTION OF PREFERRED EMBODIMENT

1. Overview

Figure 1:
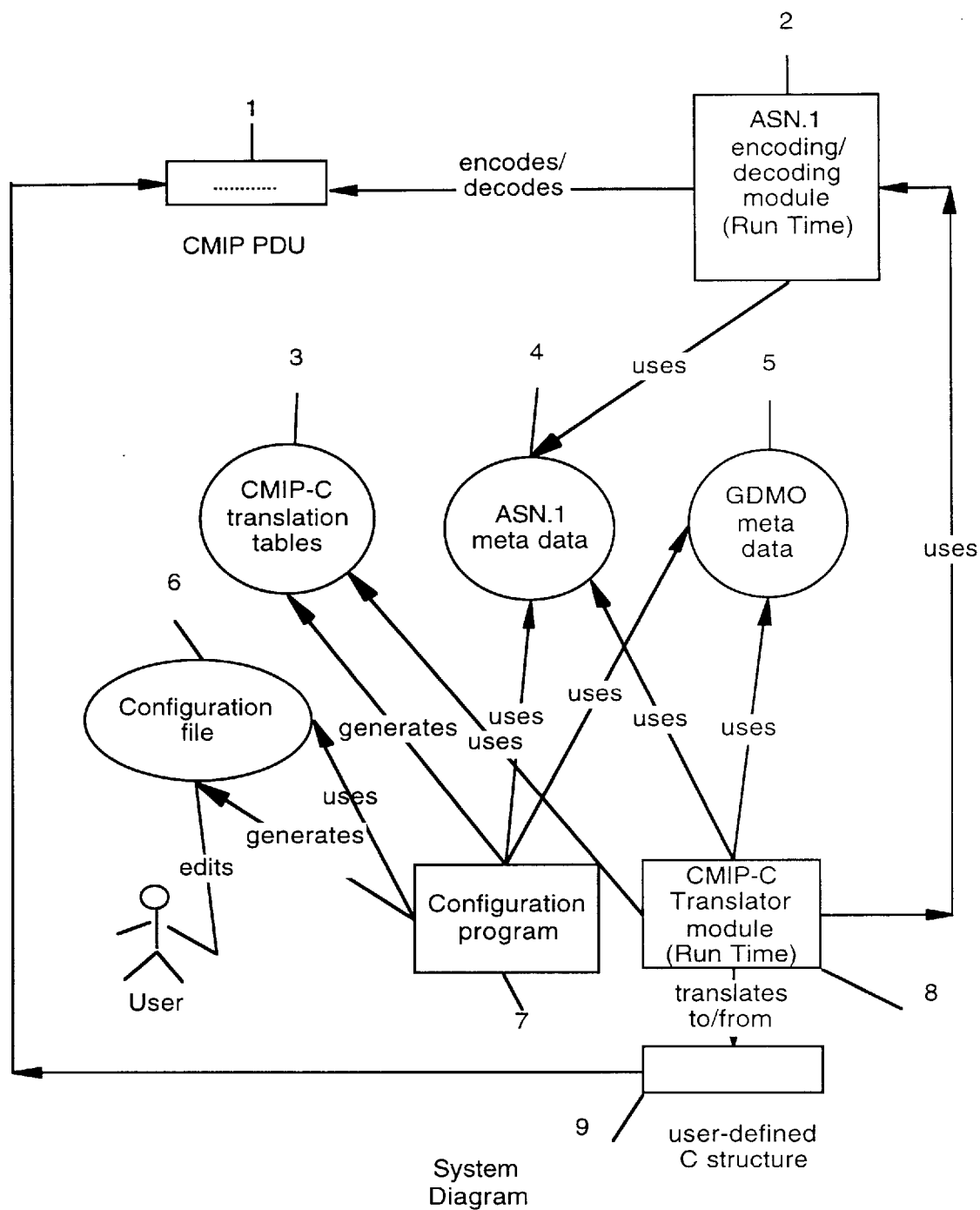
FIG. 1 is a present preferred system diagram with all the components, inputs, outputs and the relationships between them.

The preferred embodiment of the present invention is implemented in the form of a configuration program and a run-time translator library module as shown in FIG. 1. The configuration program 7 creates an initial configuration file 6, propagates user's configuration to all relevant constructs, and creates translation tables 3 and C data structures according to input configuration information. The run-time translator library module 8 uses the translation tables 3 generated by the configuration program 7 to implement translations between CMIP PDU 1 and the corresponding user-designed C data structure 9. An ASN.1 encoding/decoding module 2 is used to decode/encode CMIP PDUs from/to standard encoding schemes into a format that can be conveniently used by application programs. The set of encoding/decoding routines constituting this module can be of the type described in the DSET ASN.C Programmer's Reference Manual.

Figure 2A:
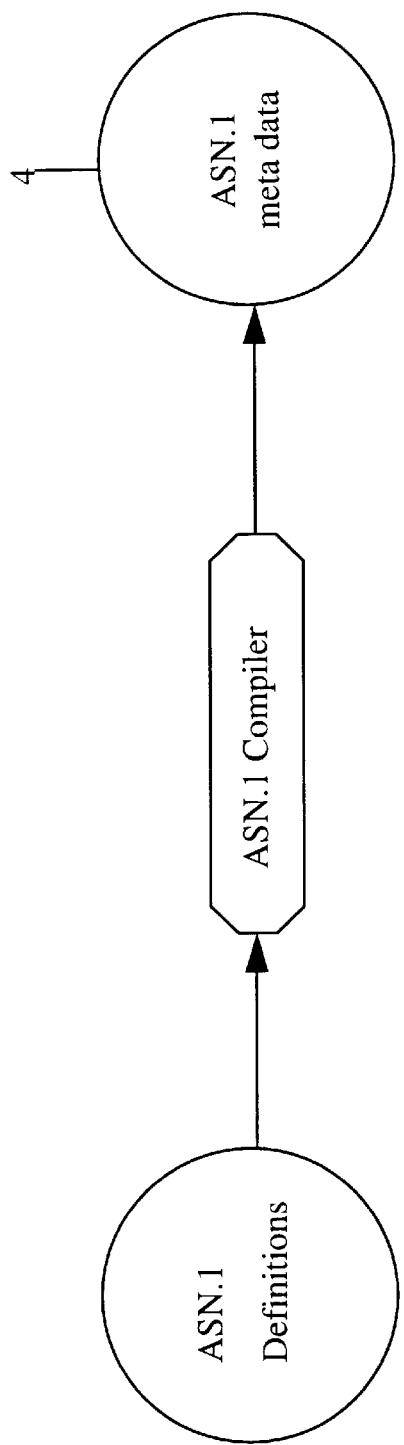
FIG. 2a is a diagram showing the generation of ASN.1 meta data by the ASN.1 compiler.
Figure 2B:
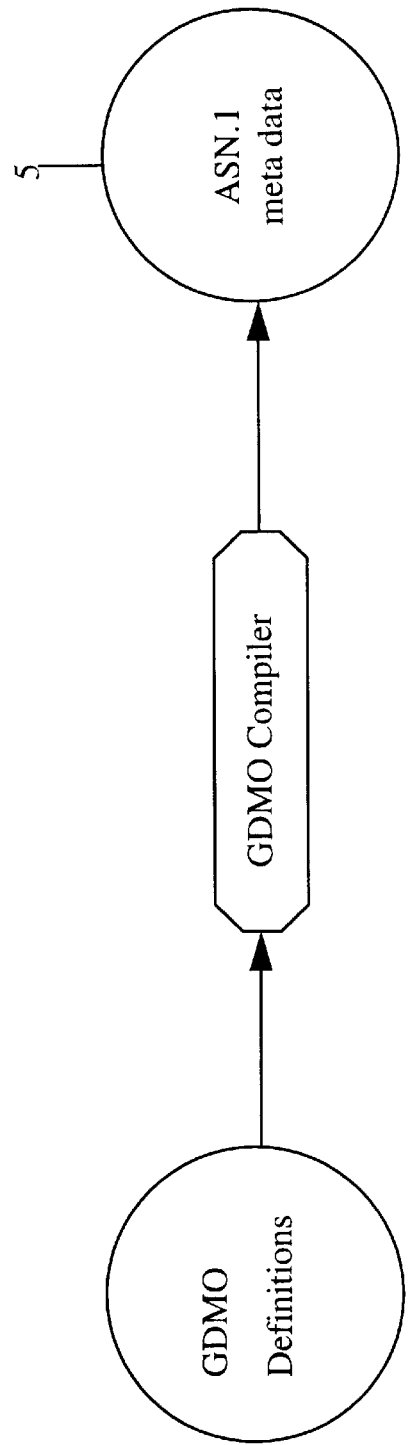
FIG. 2b is a diagram showing the generation of GDMO meta data by the GDMO compiler.

FIGS. 2a and 2b show the generation of ASN.1 Type information (also referred to as ASN.1 meta data) and GDMO Template information (also referred to as GDMO meta data) by the ASN.1 and GDMO compilers from ASN.1 and GDMO definitions respectively. The ASN.1 compiler and GDMO compiler parse the ASN.1 and GDMO definitions and generate meta data that represent the information provided in original source files in a format that is convenient for use by other applications that need to access this information (such as the configuration program, translator, ASN.1 encoder/decoder). The usage of ASN.1 and GDMO compilers are described in the DSET ASN.C Programmer's Reference Manual and GDMO Compiler Programmer's Manual, respectively.

Figure 3:
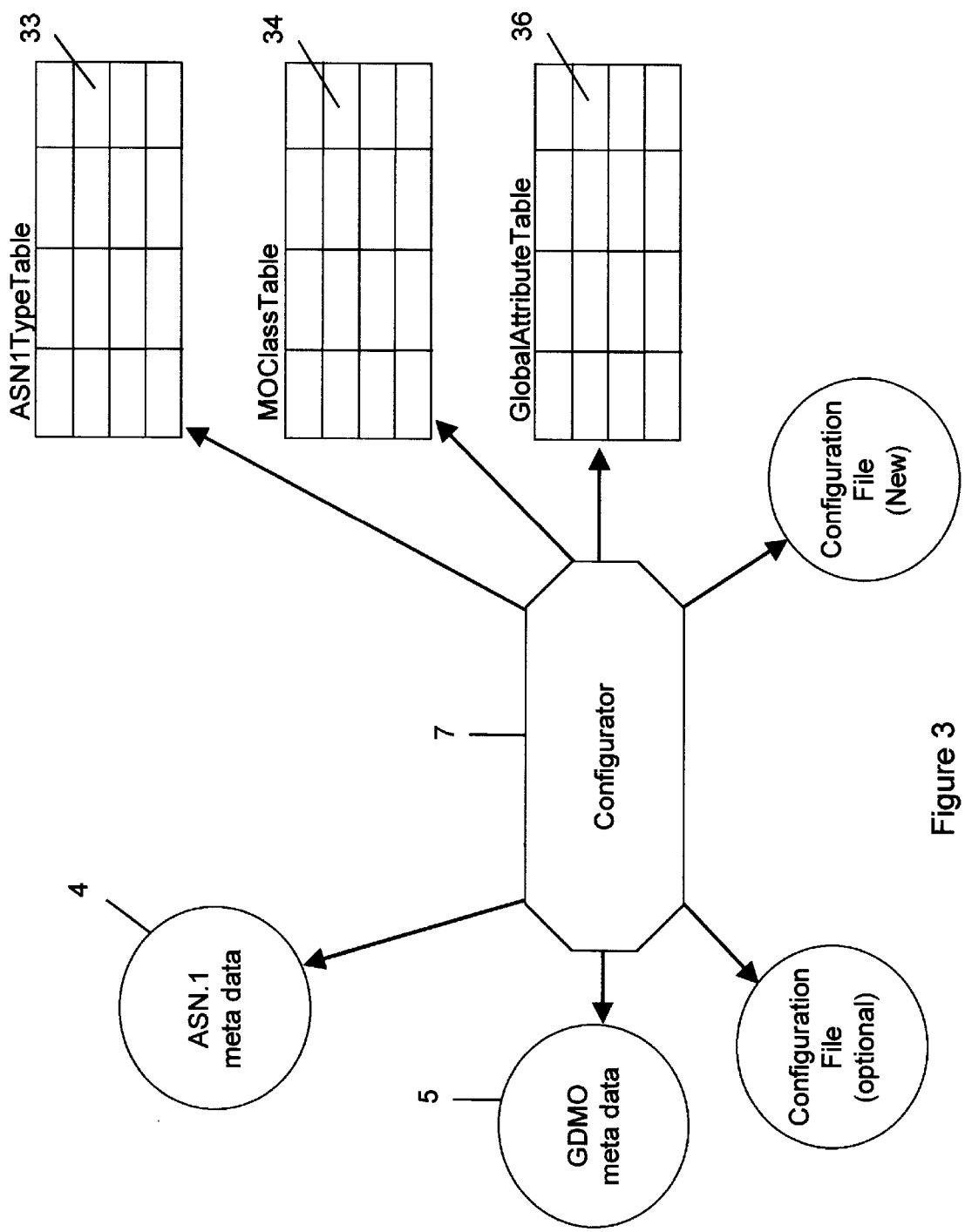
FIG. 3 is a block diagram showing the configuration program generating CMIP<-->C translation tables or a new configuration file from the ASN.1 and GDMO meta data, and an optional input configuration file.

FIG. 3 shows the configuration program in isolation. The configuration program 7 receives ASN.1 and GDMO meta data 4 and 5, and, user's configuration specifications (if any) as input, and generates translation tables (ASN1TypeTable, MOClassTable and GlobalAttributeTable) or a new configuration file as output. The configuration program can be used in two modes: in one mode it generates a new configuration file based on the ASN.1 and GDMO meta data and any optional input configuration file; in the second mode, it generates the translation tables for use by the translator module. In the first mode, the configuration program can be used iteratively such that the user needs to provide configuration information for only a few MO classes and ASN.1 types, and propagate the same configuration information to all other MO classes and attributes that depend on them. This facility minimizes the amount of configuration work that the user needs to perform. When the configuration is complete, the user can run the configuration program in the second mode to generate the translation tables for use by the run-time translator library module.

Figure 4:
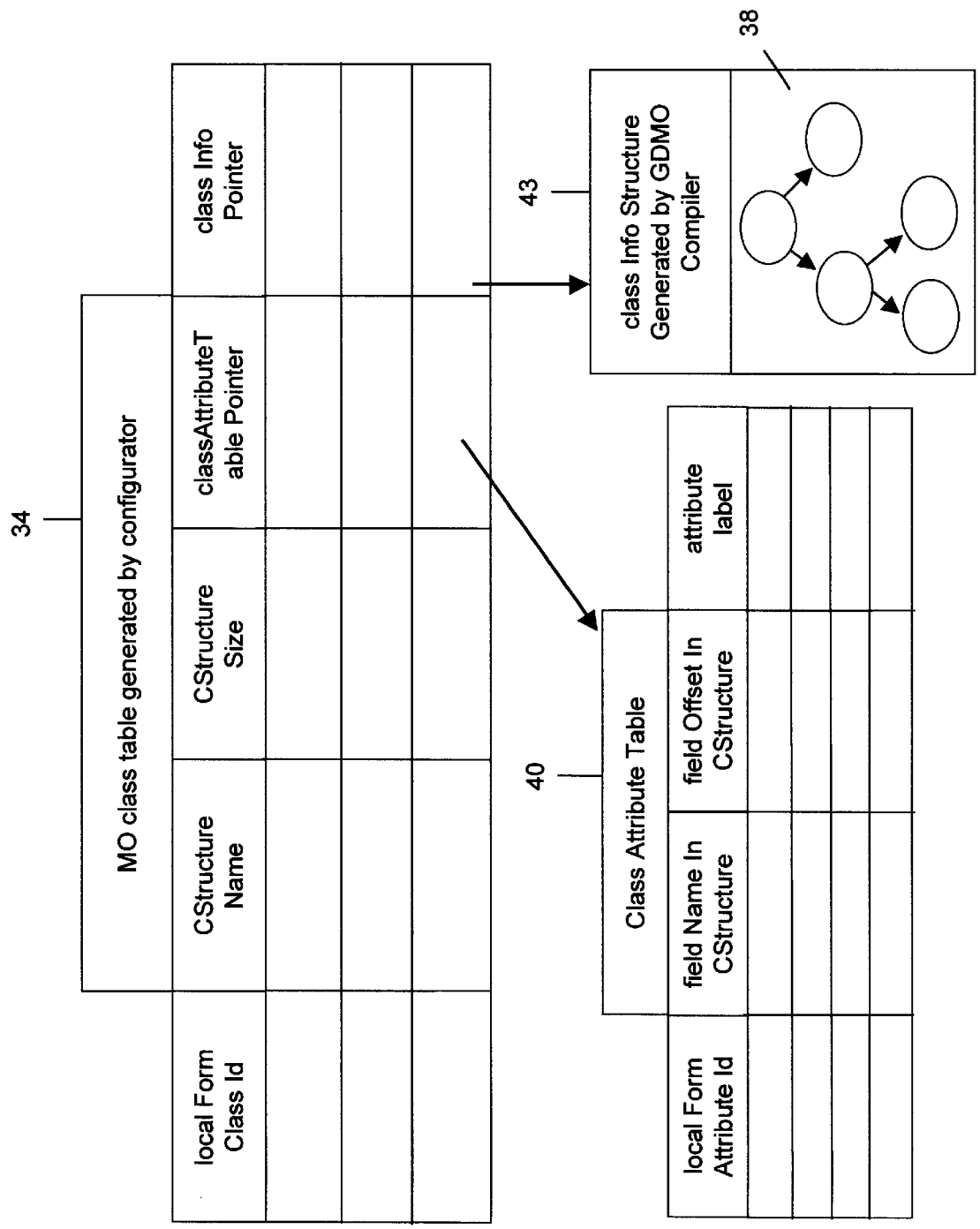
FIG. 4 is a diagram representing the structure of the MOClassTable generated by the configuration program.
Figure 5:
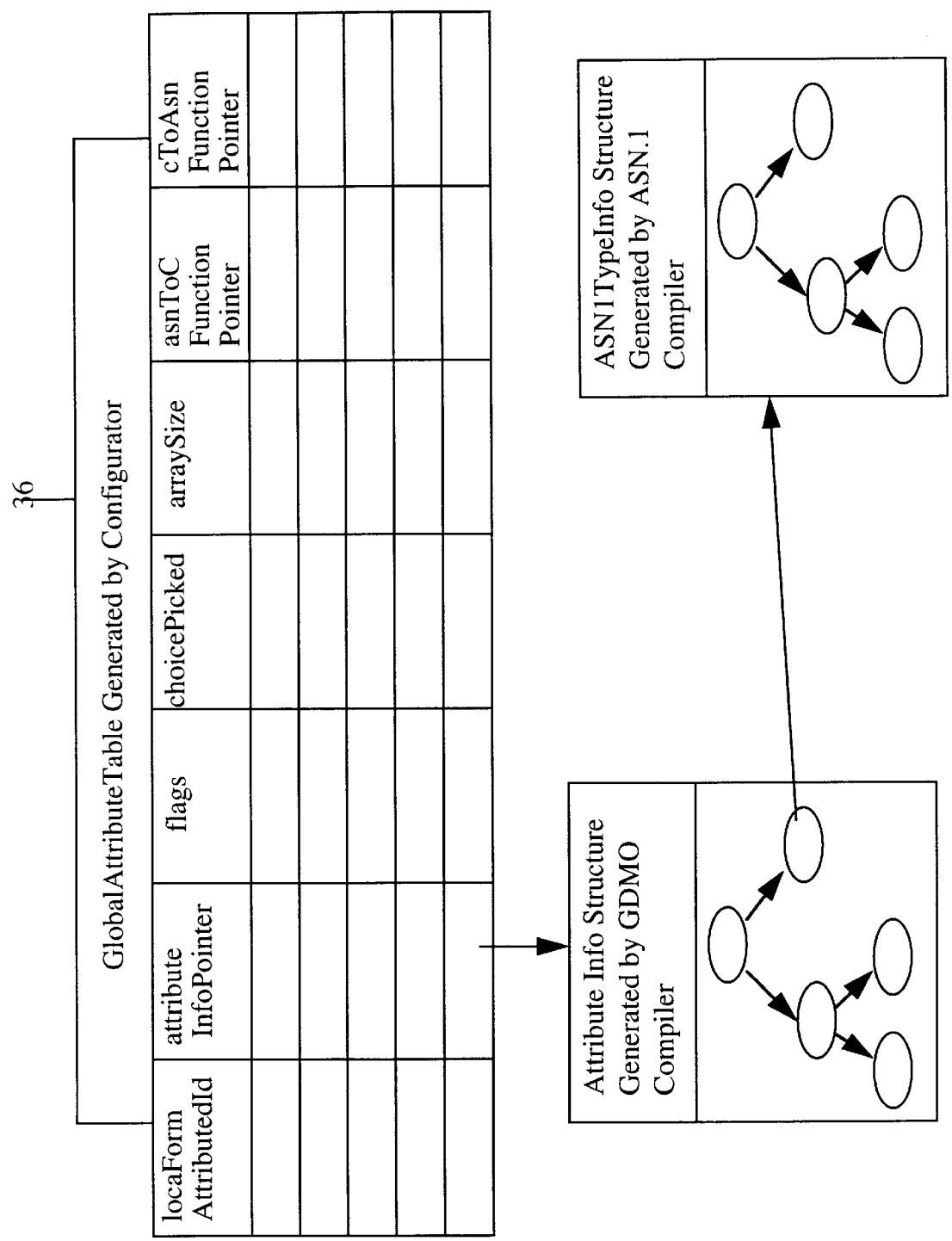
FIG. 5 is a diagram representing the structure of the GlobalAttributeTable generated by the configuration program.
Figure 6:
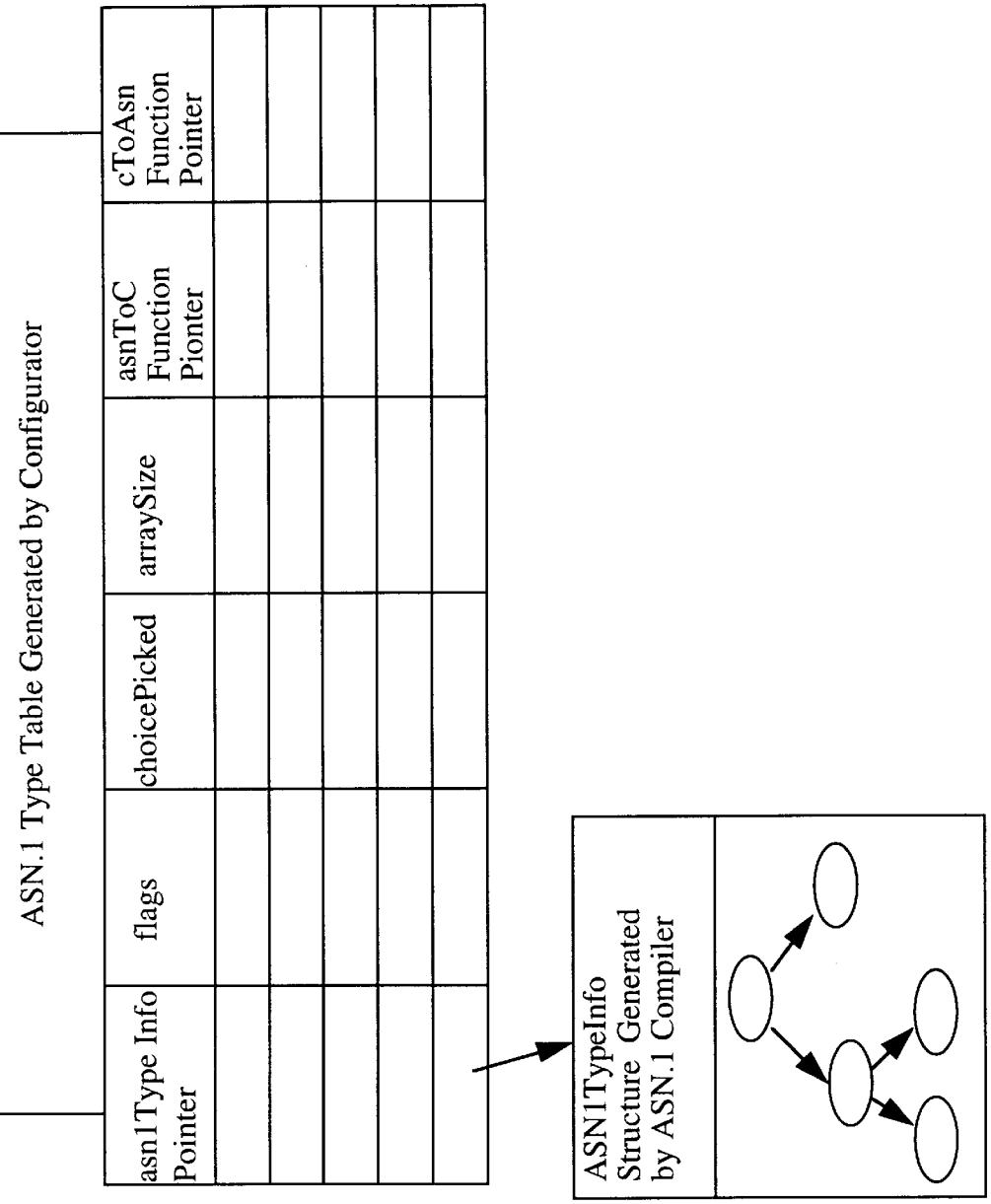
FIG. 6 is a diagram representing the structure of the ASN1TypeTable generated by the configuration program.

FIGS. 4 through 6 illustrate the information stored in various tables that are used in the configuration and translation processes. Section 3 describes these tables in detail.

FIGS. 7 through 22 are flow charts illustrating the steps involved in the configuration process. These are described in detail in section 5.

FIGS. 23a through 28 are flow charts illustrating the steps involved in translating a CMIP CreateArgument to user-designed C data structure for the corresponding MO Class. Translations to/from other CMIP arguments follow similar steps and hence are not explicitly shown in flow charts. Section 6 describes these flow charts in detail, and identifies differences in translating from/to other CMIP arguments to/from C structures.

Section 2 discusses the relationship between relevant GDMO templates and the configuration specifications used/generated by the configuration program. Section 4 introduces the various CMIP request/response Arguments which are translated to/from user's C structures by the translator module.

2. Configuration Specifications and GDMO Templates

The configuration program uses three types of specifications for allowing the user to customize the structures to be used to represent Managed Object data and the translations to/from these structures. The CLASS configuration specifications, ATTRIBUTE configuration specifications, and the TYPE configuration specifications are used to provide configuration information at Managed Object Class, Attribute, and ASN.1 type levels, respectively.

2.1 Class Level Configuration

The CLASS configuration specifications preferably provide the C structure name, the set of attributes of this class that the user is interested in keeping in the C structure, and an integer value identifier (called localForm identifier) for the class.

A sample template for such a specification is given below.

```
CLASS <class-label> {
    DATA-TYPE <C-structure-name> ;
    LOCAL-ID <number> ;
    ATTRIBUTES [ <attribute-label> [: field-name-in-C-structure]
        [, <attribute-label> [: field-name-in-C-structure] ]*] ;
}
```

If the user does not want to store some attributes in the C structures, he can remove those attributes from the CLASS configuration specification of the managed object class. Since the configuration process can be carried out in an incremental fashion, the user can configure the attribute-list for the classes higher up in the inheritance hierarchy, and let the configuration program automatically propagate this configuration information to the derived classes.

2.2 Attribute Level Configuration

The ATTRIBUTE configuration specifications preferably provide the field name in the C structure, the C data type to be used for storing the attribute value, if the attribute syntax is of CHOICE type and only one member of the CHOICE needs to be supported, the user can specify which member is supported, and names of the conversion functions to be used for translating the attribute value from ASN.1 to C form or from C to ASN.1 form. The last specification is not necessary for attributes whose values are of directly translated ASN.1 types (see FIG. 25 for directly translated ASN.1 types) unless the user wants to perform a different type of translation.

A sample template for ATTRIBUTE configuration specification is given below:

```
ATTRIBUTE <attribute-label> {
    FIELD-TYPE <field-type-in-C-structure>
        [, ARRAY-SIZE = <number>] ;
    LOCAL-ID <number>
    [ CHOICE-PICKED <choice-member> ; ]
    [ ASN2C <asn.1-to-c-conversion-function-name> ; ]
    [ C2ASN <C-to-ASN.1-conversion-function-name> ; ]
}
```

2.3 ASN.1 Type Level Configuration

This is similar to attribute configuration, except that no localForm identifier is assigned to the ASN.1 types. The configuration program can be used to propagate the configuration information of an ASN.1 type to all unconfigured attributes whose values are of this type.

A sample template for TYPE configuration specification is given below:

```
TYPE <type-label> {
    FIELD-TYPE <field-type-in-C-structure>
        [, ARRAY-SIZE = <number>] ;
    [ CHOICE-PICKED <choice-member> ; ]
    [ ASN2C <asn.1-to-c-conversion-function-name> ; ]
    [ C2ASN <C-to-ASN.1-conversion-function-name> ; ]
}
```

2.4 GDMO Templates

The ISO/IEC 10165-4 (CCITT X.722) standard provides various constructs for defining the structure of management information. A GDMO compiler parses such definitions and generates meta data that represents the information in a form that is convenient to access from a program. The constructs that are of interest for the present invention are listed below:

The MANAGED OBJECT CLASS template has the following structure:

```
<class-label> MANAGED OBJECT CLASS
    [DERIVED FROM <class-label> [,<class-label>]*;
    [CHARACTERIZED BY <package-label> [, <package-label>]*;
    [CONDITIONAL PACKAGES <package-label>
        PRESENT IF condition-definition
        [, <package-label> PRESENT IF condition-definition]*;
REGISTERED AS object-identifier;
```

In this template structure, the "DERIVED FROM" clause specifies the list of super classes of the managed object class being defined; the "CHARACTERIZED BY" clause specifies the list of mandatory packages of this class; the "CONDITIONAL PACKAGES" clause specifies the list of optional packages of the class. Each package may include a number of attributes and/or attribute groups, and, each attribute group includes one or more attributes (see the PACKAGE and ATTRIBUTE GROUP templates below). The configuration program makes use of this information to generate the CLASS configuration specifications.

For example, consider the following definition of the au3CTPBidirectional Managed Object class defined in the ITU-T G.774 standard:

```
au3CTPBidirectional MANAGED OBJECT CLASS
    DERIVED FROM
        "Rec. M.3100:1992":connectionTerminationPointBidirectional,
        au3CTPSink,
        au3CTPSource;
REGISTERED AS { g774ObjectClass 1 };
```

Here, the au3CTPBidirectional Managed Object class is derived from three super classes, namely connectionTerminationPointBidirectional (defined in ITU-T M.3100 standard), au3CTPSink, and au3CTPSource classes. This class does not define any packages but inherits several packages from each of the three super classes. In particular, it inherits the attributes alarmStatus, characteristic Information, currentProblemList, downstreamConnectivity Pointer, operationalState, supportedByObjectList and upstreamConnectivityPointer attributes from the connectionTerminationPointBidirectional class and its super classes, pointerSinkType from au3CTPSink class, pointerSourceType from au3CTPSource class, au3CTPId from both au3CTPSink and au3CTPSource classes, and nameBinding and objectClass attributes from the top class which is an ancestor to all other classes in the inheritance hierarchy. For this class, a preferred CLASS configuration generated by the configuration program looks like the following:

```
CLASS au3CTPBidirectional {
    DATA-TYPE RM__Au3CTPBidirectional
    LOCAL-ID 1;
    ATTRIBUTES
        alarmStatus,
        au3CTPId,
        characteristicInformation,
        currentProblemList,
        downstreamConnectivityPointer,
        nameBinding,
        objectClass,
        operationalState,
        pointerSinkType,
        pointerSourceType,
        supportedByObjectList,
        upstreamConnectivityPointer
        ;
}
```

The PACKAGE template has the following structure:

```
<package-label> PACKAGE
    [BEHAVIOUR <behaviour-definition-label>
        [, <behaviour-definition-label>]*;]
    [ATTRIBUTES<attribute-label> propertyList [<parameter-label>]*
        [, <attribute-label> propertyList [parameter-label>]*]*;]
    [ATTRIBUTE GROUPS <group-label> [<attribute-label>]*
        [, <group-label> [<attribute-label>]*]*;]
    [ACTIONS <action-label> [<parameter-label>]*
        [, <action-label> [<parameter-label>]*]*;]
    NOTIFICATIONS <notification-label> [<parameter-label>]*
        [, <notification-label> [<parameter-label>]*]*;]
[REGISTERED AS object-identifier];
```

The attributes specified in the ATTRIBUTES clause and the attributes from the attribute groups specified in the ATTRIBUTE GROUPS clause of each package included in a managed object class or inherited from super classes are used by the configuration program in generating the default configuration for that class, as shown above.

The ATTRIBUTE template has the following structure:

```
<attribute-label> ATTRIBUTE
    derived-or-with-syntax-choice;
    [MATCHES FOR qualifier [, qualifier]* ;]
    [BEHAVIOUR <behaviour-definition-label>
        [, <behaviour-definition-label>]* ;]
    [PARAMETERS <parameter-label> [, <parameter-label>]* ;]
REGISTERED AS object-identifier;
```

The ASN.1 type of an attribute value is specified in the derived-or-with-syntax-choice clause of the ATTRIBUTE template. The configuration program makes use of this information in generating the default configuration specifications for attributes.

For example, consider the definition for alarmStatus attribute defined in the ITU-T M.3100 standard:

```
alarmStatusM3100 ATTRIBUTE
    WITH ATTRIBUTE SYNTAX ASN1DefinedTypesModule.
        AlarmStatus;
    MATCHES FOR EQUALITY;
    BEHAVIOUR
        alarmStatusBehaviour BEHAVIOUR
        DEFINED AS "The Alarm Status attribute type indicates the
        occurrence of an abnormal condition relating to an object.
        This attribute may also function as a summary indicator of
        alarm conditions associated with a specific resource. It is used
        to indicate the existence of an alarm condition, a pending
        alarm condition such as threshold situations, or (when used as
        a summary indicator) the highest severity of active alarm
        conditions. When used as a summary indicator, the order of
        severity (from highest to lowest) is:
            activeReportable-Critical
            activeReportable-Major
            activeReportable-Minor
            activeReportable-Indeterminate
            activeReportable-Warning
            activePending
            cleared ";;
REGISTERED AS {m3100Attribute 6};
```

The ASN.1 type for this attribute is defined as:

```
AlarmStatus ::= ENUMERATED {
    cleared(0),
    activeReportable-Indeterminate(1),
    activeReportable-Warning(2),
    activeReportable-Minor(3),
    activeReportable-Major(4),
    activeReportable-Critical(5),
    activePending(6)}
```

The default configuration generated for this attribute is shown below:

```
ATTRIBUTE alarmStatus {
    LOCAL-ID 6;
    FIELD-TYPE unsigned char;
}
```

Since the AlarmStatus ASN.1 type is defined as an enumeration type and its values are between 0 and 6, one byte is sufficient to represent this value in C. Because of this, the default type generated by the configuration program is unsigned char. No conversion functions are generated so that the default translation of copying an integer value takes place. If the user uses a different data type to store this attribute, this configuration specification can be changed to specify the desired field-type and conversion functions.

The ATTRIBUTE GROUP template has the following structure:

```
<group-label> ATTRIBUTE GROUP
    [GROUP ELEMENTS <attribute-label> [, <attribute-label>]* ;
    [FIXED ;]
    [DESCRIPTION delimited-string;]
REGISTERED AS object-identifier;
```

Attribute groups are used to collect several related attributes into a group. The configuration program adds individual attributes from all attribute groups to the attribute list for generating the ATTRIBUTES clause of the CLASS configuration specification.

The NOTIFICATION template has the following structure:

```
<notification-label> NOTIFICATION
    [BEHAVIOUR <behaviour-definition-label>
        [, <behaviour-definition-label>]*;]
    [PARAMETERS <parameter-label> [, <parameter-label>]*;]
    [WITH INFORMATION SYNTAX type-reference
        [AND ATTRIBUTE IDS <field-name><attribute-label>
            [, <field-name><attribute-label>]*];]
    [WITH REPLY SYNTAX type-reference;]
REGISTERED AS object-identifier;
```

Among other things, the NOTIFICATION template specifies the syntax of information carried in an event-report-PDU whose event-type corresponds to this notification. This syntax corresponds to the information carried in the eventInfo field of an EventReportArgument (see Section 4), and is specified by the "WITH INFORMATION SYNTAX" clause, or by a parameter specified in the PARAMETERS clause. The "AND ATTRIBUTE IDS" sub-clause specifies the relationship between different fields in the specified ASN.1 type and different attributes. Typically there is a logRecord sub-class associated with each notification type, and the attributes of that class correspond to the attributes specified with the "WITH INFORMATION SYNTAX" clause. The translator module makes use of this information to perform translations between the C structure associated with the logRecord sub-class and an event-report-PDU of an event-report request of this type.

3. Representation of Configuration Information in Tables

The configuration program acts as a producer as well as a consumer of configuration information. In the producer role it generates default configuration information based on the GDMO and ASN.1 meta data. In the consumer role it takes as input user's configuration information and generates either the translation tables or a new configuration file with the original configuration information propagated to other GDMO constructs that use these constructs in their definitions. The configuration program may be used in both the roles at the same time in order to perform incremental configuration.

The configuration program builds and uses the MOClassTable, GlobalAttributeTable, and ASN1TypeTable in the configuration stage.

The MOClassTable shown in FIG. 4 contains an entry for each configured Managed Object Class. The localFormClassId field contains the local-form identifier (an integer value) specified using the LOCAL-ID clause of the CLASS configuration. This may be used internally in place of the object-identifier of the class. The CStructureName corresponds to the name of the C structure specified with the DATA-TYPE clause of the CLASS configuration. By default the configuration program derives this name from the managed object class name (for example by adding a prefix and capitalizing the first letter of the class name). The user can set this to his/her own data structure name, if desired. The CStructureSize field contains the size of the C structure specified in the DATA-TYPE clause. This is only set in the translation tables (the sizeof( )operator may be used to compute this size), and is not used in the configuration stage. The ClassInfoPointer field is used to store a link to the meta data generated by the GDMO compiler for this managed object class definition. The ClassAttributeTablePointer points to a class-specific attribute table that contains an entry for each attribute included in the ATTRIBUTES clause of the CLASS specification. The localFormAttributeId field of each ClassAttributeTable entry contains the local-form identifier value of the attribute. This value is copied from the corresponding entry in the GlobalAttributeTable at the time of generating translation tables or a new configuration file. The fieldName field is set to the field-name specified for this attribute in the ATTRIBUTES clause, or to the attribute-label if the field-name is omitted. The fieldOffset field is set to the offset of the corresponding field in the C structure associated with the managed object class. This field is set only in the translation tables (the offsetof( ) macro may be used to compute the offset of the field) and is not used in the configuration stage.

The GlobalAttributeTable shown in FIG. 5 contains an entry for each attribute that is included in the ATTRIBUTES clause of at least one managed object class configuration. The localFormAttributeId is a local-form identifier (an integer value) specified using the LOCAL-ID clause of ATTRIBUTE specification. The AttributeInfoPointer points to the meta data generated by the GDMO compiler for this attribute definition. The flags field is used to record information regarding the C data type used to store this attribute value. Different bit-positions in the flags field may be used to indicate different characteristics of the C data type such as the following: signed/unsigned integer, 1-byte integer or a 2-byte integer, or a 4-byte integer, array-type, etc. This information is obtained from the FIELD-TYPE clause of the ATTRIBUTE configuration. The choicePicked field is used to specify which CHOICE member is the only supported field. This is specified in the CHOICE-PICKED clause of the attribute configuration. The arraySize field specifies the length of the array if the C field-type is an array type. If the underlying ASN.1 type is a fixed-length "SET OF"/"SEQUENCE OF" type, then, by default, this value is equal to the size specified in the definition of this "SET OF"/"SEQUENCE OF" type. If this is a variable-length array, then this field may be set to a maximum length allowed by the application to use fixed-length array representation, or, set it to 0 to indicate usage of a variable-length array in the data representation also. By default, variable-length arrays in the target representation are represented by a structure that contains a base-pointer and an array-length field. This is specified by using the ARRAY-SIZE clause in the ATTRIBUTE configuration. The Asn1ToC_convFunction contains the name of the conversion-function (if) specified using ASN2C clause and cToAsn1_convFunction contains the name of the conversion-function (if) specified using C2ASN clause of the attribute configuration.

Each entry in the ASN1TypeTable shown in FIG. 6 is a type-configuration entry corresponding to either a TYPE configuration specification or a default configuration generated for unconfigured attribute-syntaxes. The Asn1TypeName field contains the name of the ASN.1 type, and the remaining fields are similar to the ones used in the GlobalAttributeTable.

4. CMIP Arguments

The CMIP protocol and the associated Service Element are described in detail in the standards documents CCITT X.711 and CCITT X.710, respectively.

The translator module builds or uses the attribute-lists of the following CMIP PDUs. These lists correspond to attributeList field of CreateArgument, CreateResult, GetResult, SetResult, modificationList of the SetArgument, attributeIdList of GetArgument and the attributes that correspond to the eventInfo field of the EventReportArgument (see the discussion on NOTIFICATION template above).

The translator module also needs the managed object class information which is present in all the above mentioned PDUs, except for the SetArgument and the GetArgument which may select multiple objects, in which case the managed object class information is obtained from other sources (for example this may be obtained from the Management Information Tree (MIT), or, the user may explicitly provide the class information to the translation API).

```
CreateArguement ::= SEQUENCE
{
    managedObjectClass    ObjectClass,
    instance CHOICE
    {
        managedObjectInstance    ObjectInstance,
        superiorObjectInstance   (8) ObjectInstance
    } OPTIONAL,
```

```
        accessControl              (5) AccessControl OPTIONAL,
        referenceObjectInstance    (6) ObjectInstance OPTIONAL,
        attributeList              (7) IMPLICIT SET OF Attribute OPTIONAL
    }
    CreateResult ::= SEQUENCE
        {
        managedObjectClass         ObjectClass OPTIONAL,
        managedObjectInstance      ObjectInstance OPTIONAL,
        currentTime                (5) IMPLICIT GeneralizedTime OPTIONAL,
        attributeList              (6) IMPLICIT SET OF CMIP-Attribute OPTIONAL
        }
    GetArguement ::= SEQUENCE
        {
        baseManagedObjectClass     ObjectClass,
        baseManagedObjectInstance  ObjectInstance,
        accessControl              (5) Access Control OPTIONAL,
        synchronization            (6) IMPLICIT CMISSync DEFAULT bestEffort,
        scope                      (7) Scope DEFAULT baseObject,
        filter                     CMISFilter DEFAULT and {},
        attributeIdList            (12) IMPLICIT SET OF AttributeId OPTIONAL
        }
    GetResult ::= SEQUENCE
        {
        managedObjectClass         ObjectClass OPTIONAL,
        managedObjectInstance      ObjectInstance OPTIONAL,
        currentTime                (5) IMPLICIT GeneralizedTime OPTIONAL,
        attributeList              (6) IMPLICIT SET OF CMIP-Attribute OPTIONAL
        }
    SetArgument ::= SEQUENCE
    {
        baseManagedObjectClass     ObjectClass,
        baseManagedObjectInstance  ObjectInstance,
        accessControl              (5) AccessControl OPTIONAL,
        synchronization            (6) IMPLICIT CMISSync DEFAULT bestEffort,
        scope                      (7) Scope DEFAULT baseObject,
        filter                     CMISFilter DEFAULT and {},
        modificationList           (12) IMPLICIT SET OF
            SEQUENCE
                {
                modifyOperator     (2) IMPLICIT ModifyOperator DEFAULT
replace,
                attributeId        AttributeId,
                attributeValue     ANY DEFINED BY attributeId OPTIONAL
                }
    }
    SetResult ::= SEQUENCE
        {
        managedObjectClass         ObjectClass OPTIONAL,
        managedObjectInstance      ObjectInstance OPTIONAL,
        currentTime                (5) IMPLICIT GeneralizedTime OPTIONAL,
        attributeList              (6) IMPLICIT SET OF
            CMIP-Attribute OPTIONAL
        }
    EventReportArgument ::= SEQUENCE
        {
        managedObjectClass         ObjectClass,
        managedObjectInstance      ObjectInstance,
        eventTime                  (5) IMPLICIT GeneralizedTime OPTIONAL,
        eventType                  EventTypeId,
        eventInfo                  (8) ANY DEFINED BY eventType OPTIONAL
        }
```

5. Description of Flow Charts for Processing Configuration Information

FIGS. 7 through 22 illustrate the steps of configuration process via flow charts.

Figure 7:
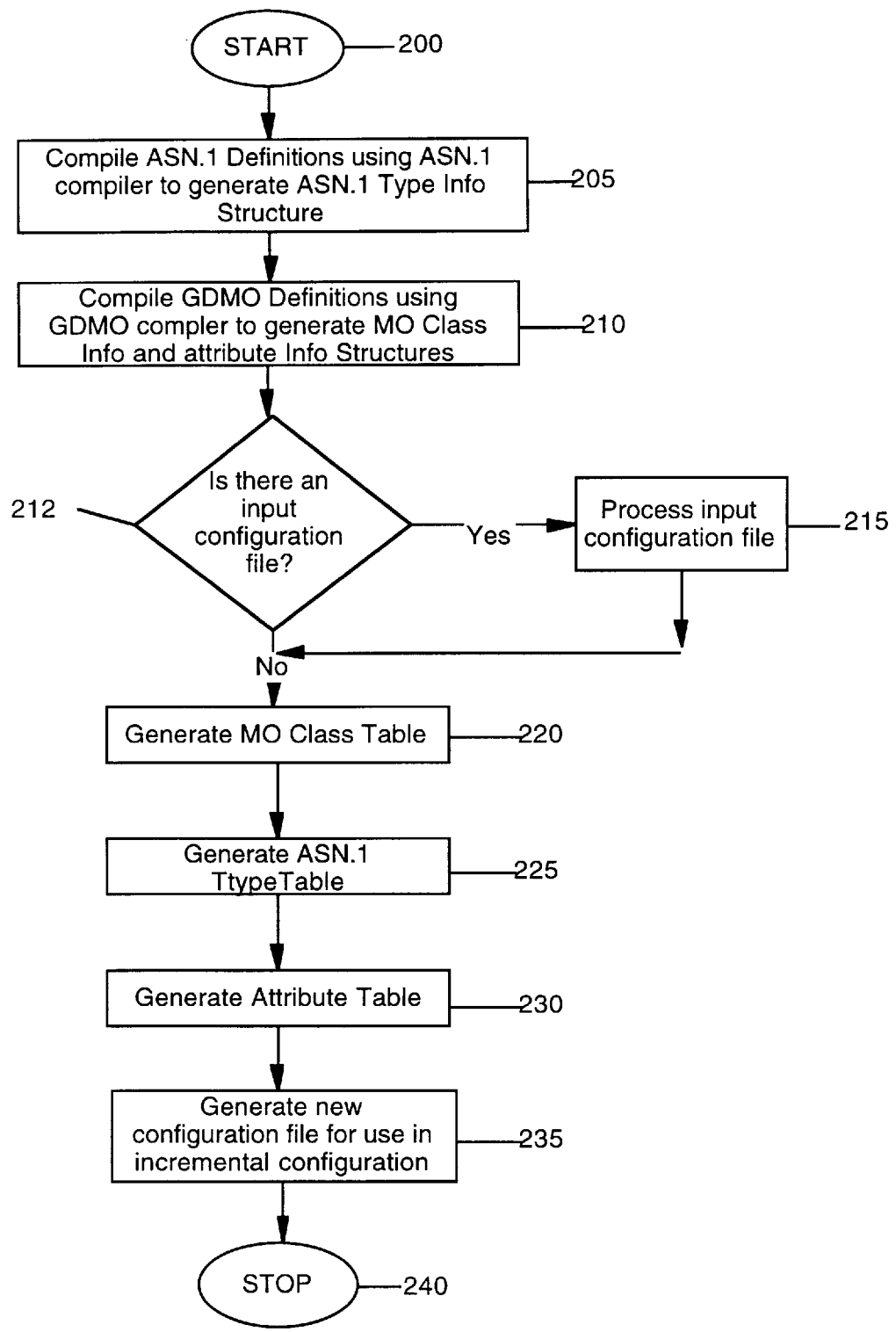
FIG. 7 is a flow chart of the overall process of generating CMIP<-->C translation tables or a new configuration file.
Figure 16:
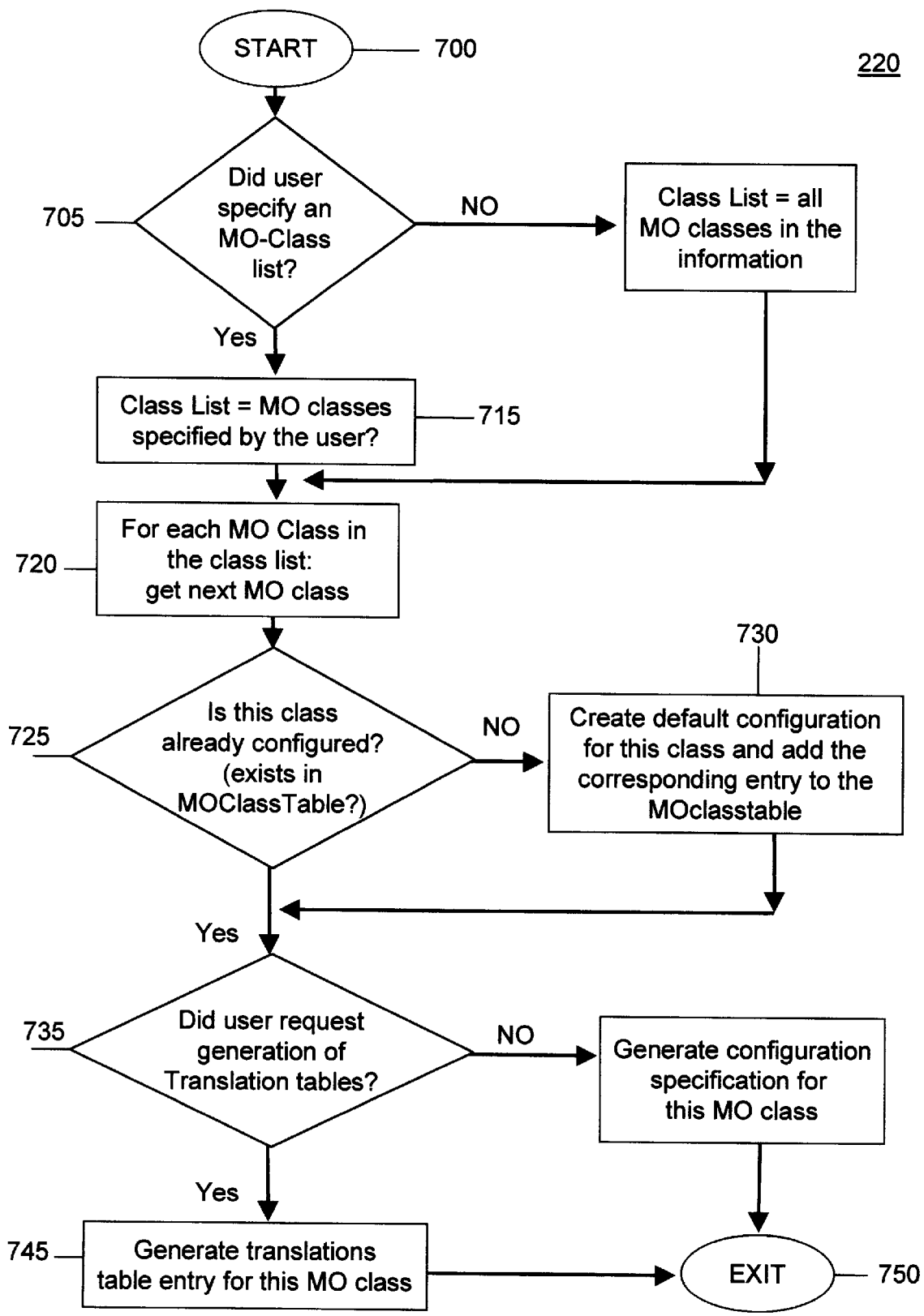
FIG. 16 is a flow chart showing the process of generating translation table entries or configuration specifications for MO classes as in step 220 of FIG. 7.
Figure 21:
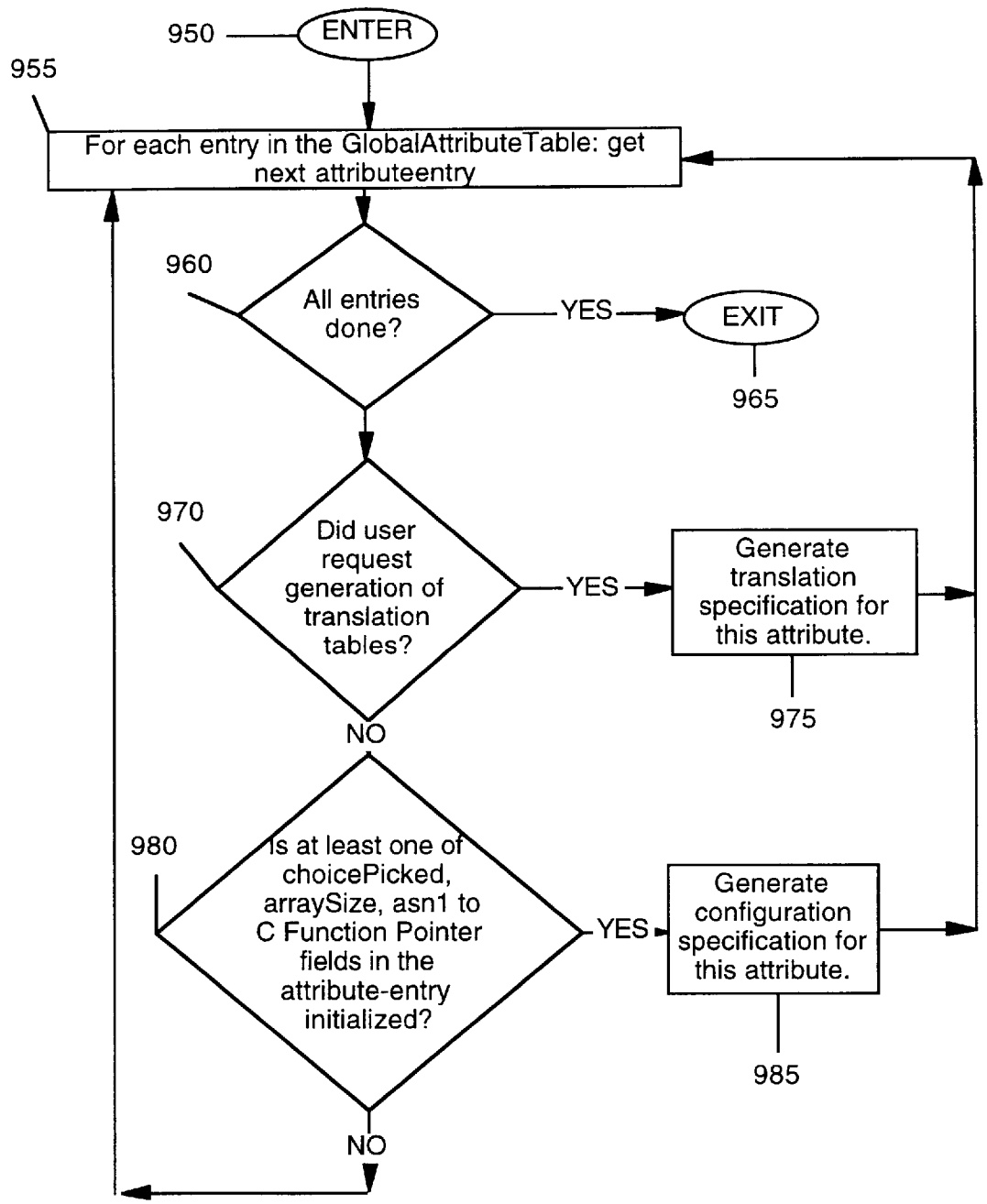
FIG. 21 is a flow chart showing the process of generating translation table entries or configuration specifications for attributes as in step 225 of FIG. 7.
Figure 22:
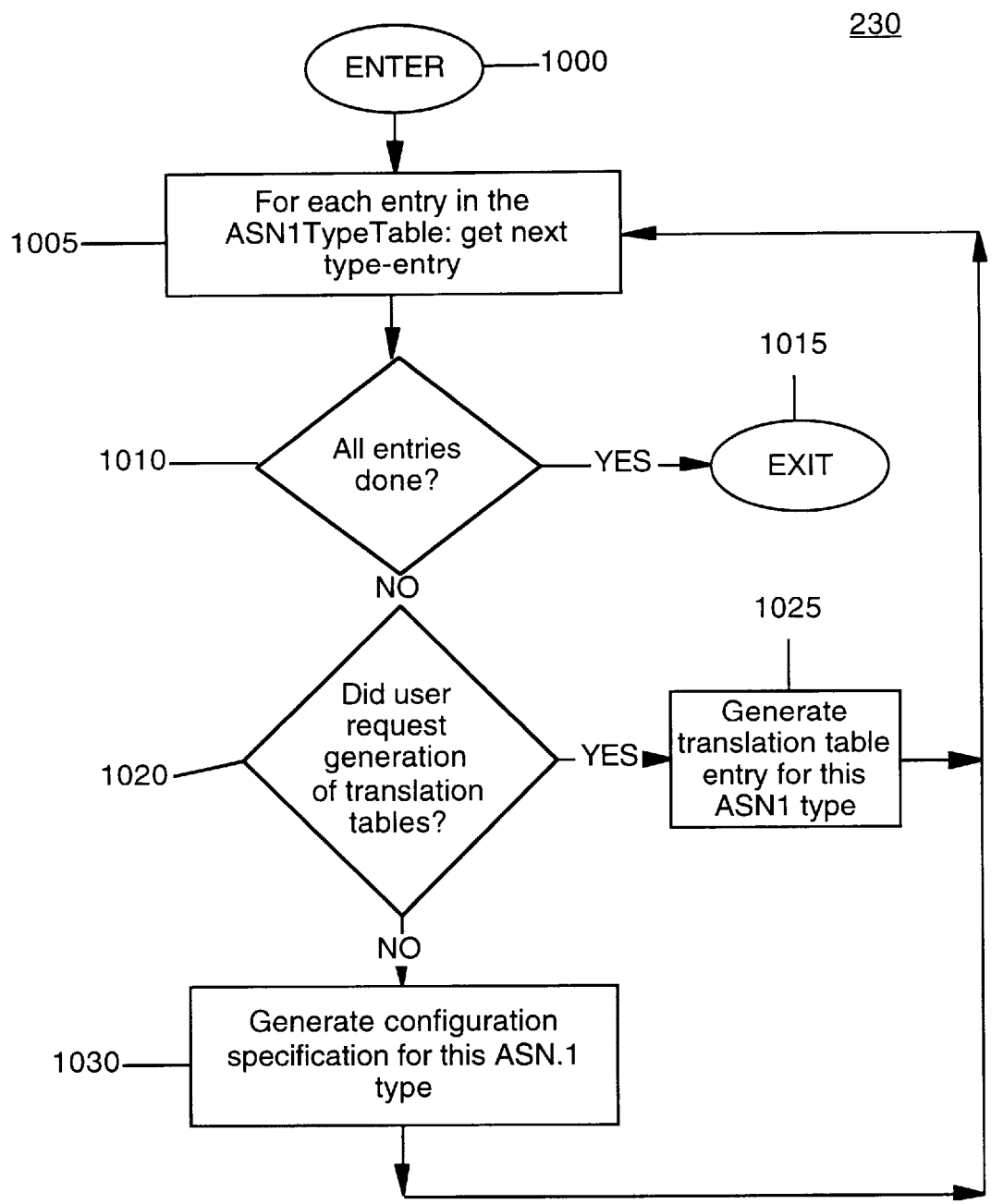
FIG. 22 is a flow chart showing the process of generating translation table entries or configuration specifications for ASN.1 types as in step 230 of FIG. 7.

FIG. 7 shows the overall picture of the configuration process starting at step 200. Step 205 compiles the ASN.1 definitions using an ASN.1 compiler to generate ASN.1 meta data. The generated ASN.1 meta data includes ASN1TypeInfo structures for each ASN.1 type defined in the input ASN.1 definitions. Step 210 compiles the GDMO definitions using a GDMO compiler to generate GDMO meta data. The generated GDMO meta data includes ClassInfo and AttributeInfo structures for all managed object classes and attributes defined in the input GDMO definitions. Step 212 checks whether an input configuration file is provided. If so, the input configuration file is processed at step 215, creating MOClassTable, ASN1TypeTable and GlobalAttributeTable entries for the processed configuration specifications. Control then reaches step 220. If no input configuration file is provided, control directly goes to step 220. Command line flags can be used to instruct the configuration program to either generate translation tables, or, to generate a new configuration file incorporating and propagating any input configuration specification. If the configuration program is instructed to generate translation tables, step 220 generates MOClassTable in a translation-tables file for later use by the translator. Otherwise, it generates a new configuration file containing the default or propagated configuration information for each class selected managed object class. This step also creates entries for attributes of the selected managed object classes in the GlobalAttributeTable, and entries in the ASN1TypeTable for ASN.1 types referred to by such attributes. FIG. 16 shows this step in greater detail. If the configuration program is instructed to generate translation tables, step 225 writes the GlobalAttributeTable built in previous steps to the translation-tables file; otherwise, it adds configuration specifications to the new configuration file for each attribute entry in the table. FIG. 21 shows this step in greater detail. If the configuration program is instructed to generate translation tables, step 230 writes the ASN1TypeTable built in previous steps to the translationtables file; otherwise, it adds configuration specifications to the new configuration file for each ASN.1 type entry in the ASN1TypeTable. FIG. 22 shows this step in greater detail.

At step 230, making use of the ASN1TypeTable built in memory, the configuration program appends ASN1TypeTable to the translation-tables, or, adds configuration specifications to the new configuration file for each type-entry in the table. The configuration process ends at step 240.

Figure 8:
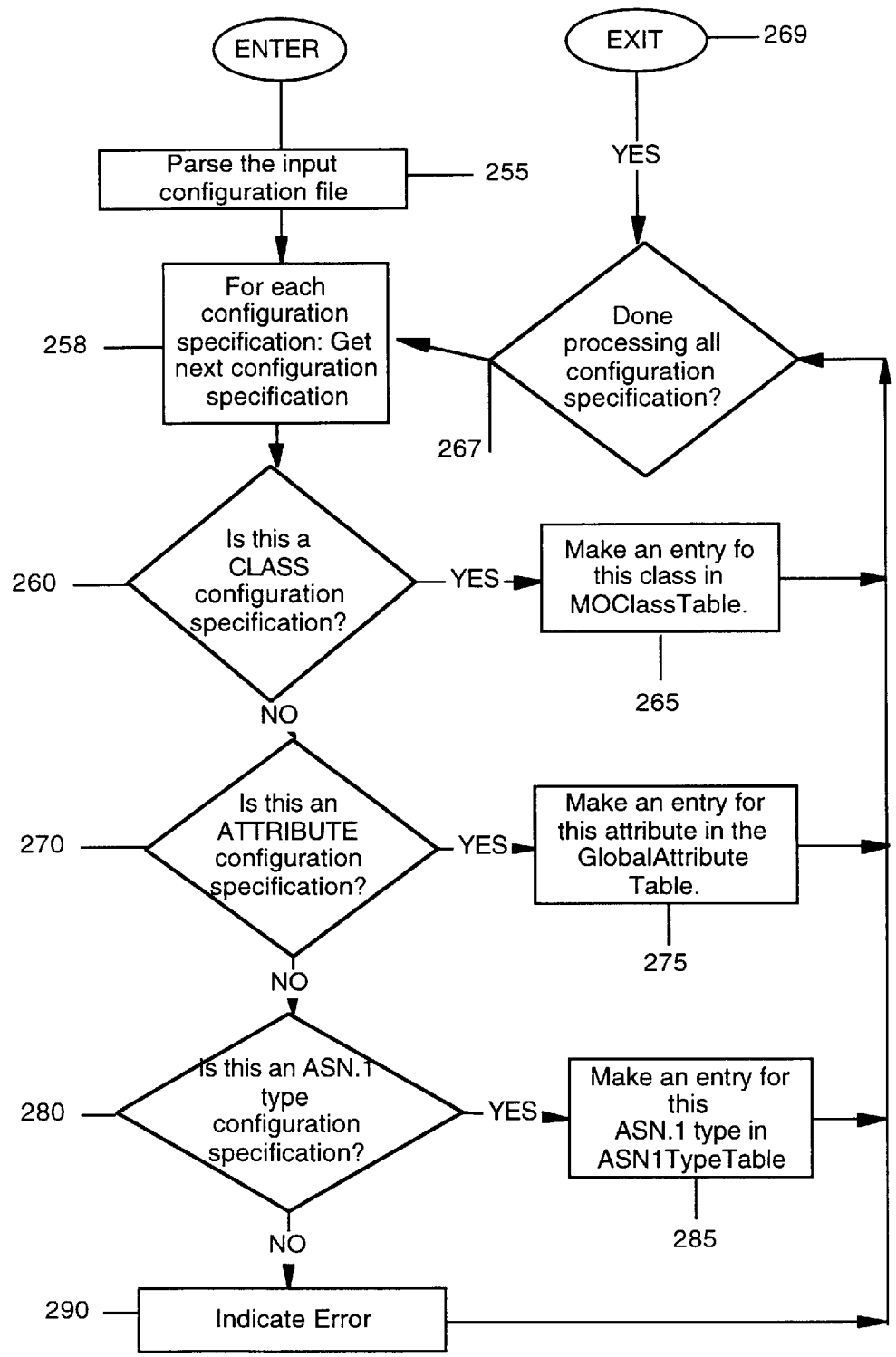
FIG. 8 is a flow chart showing the processing of the input configuration file as in step 215 of FIG. 7.

FIG. 8 shows the input configuration file processing of step 215 in greater detail. This process begins at step 250. The input configuration file is parsed at step 255, reading the configuration specifications into memory. In step 258, each configuration specification is retrieved. Step 260 checks if the current specification is for CLASS configuration. If so, an entry is made for this class in the MOClassTable in step 265, and the control reaches step 267. If not, a check is made in step 270 to determine if the current specification is for ATTRIBUTE configuration. If so, an entry is made for this attribute in the GlobalAttributeTable in step 275, and the control reaches step 267. If not, a check is made in step 280 to determine if the current specification is for TYPE configuration. If so, an entry is made in the ASN1TypeTable for this ASN.1 type in step 285, and the control reaches step 267. Otherwise, error indication is given in step 290, and control reaches step 267. Step 267 checks if all configuration specifications are processed. If so, the routine exits in step 269. If not, control goes back to step 258 for processing the next configuration specification.

Figure 9:
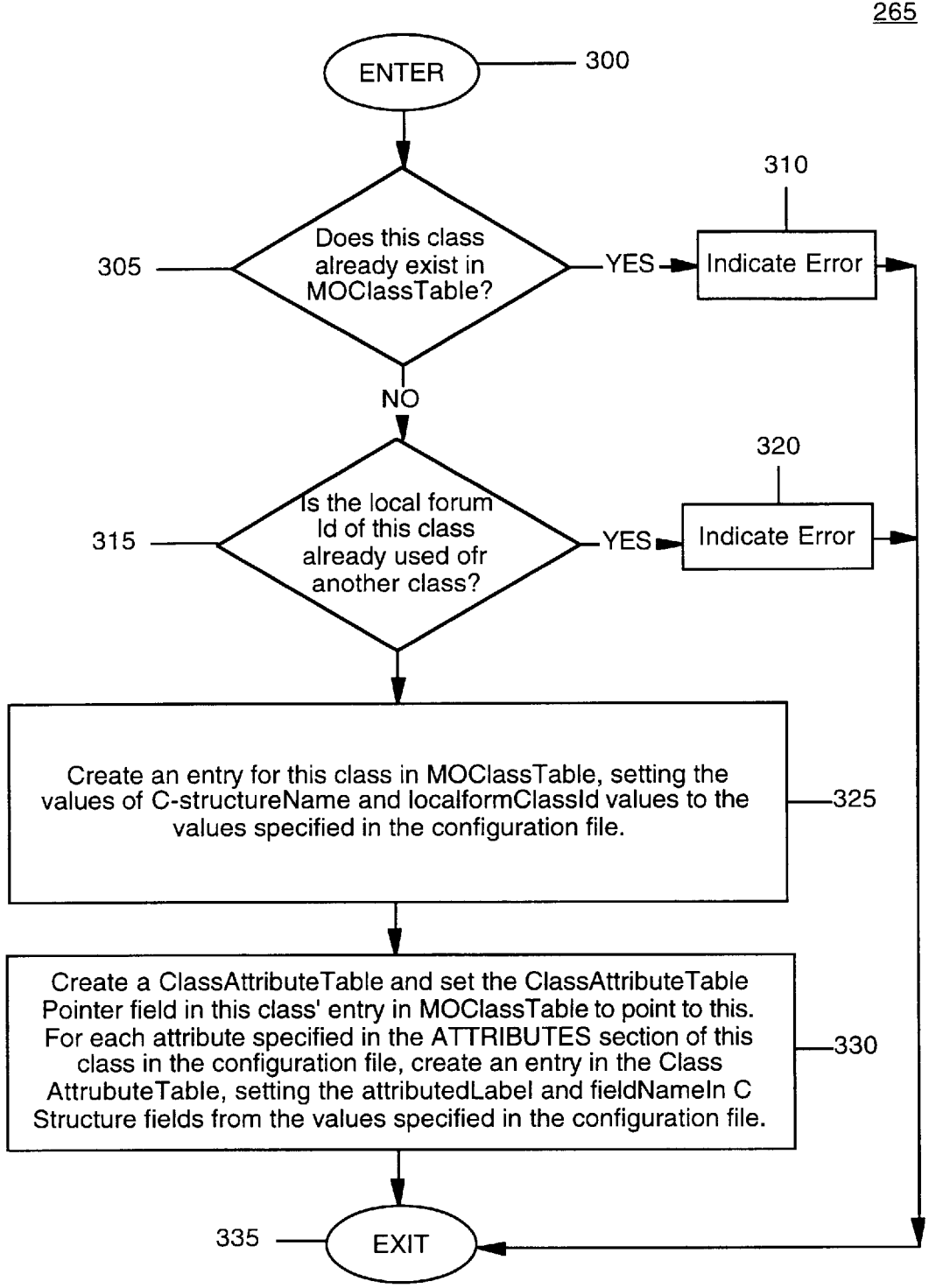
FIG. 9 is a flow chart showing the creation of an entry in the MOClassTable for an MO class as in step 265 of FIG. 7.

FIG. 9 shows in detail step 265 which makes an entry in the MOClassTable to store the information provided in the CLASS specification. The routine begins at step 300. In step 305, a check is made to determine if an entry for the class being configured already exists in the MOClassTable. If so, a duplicate configuration error indication is given in step 310, and the routine exits at step 335. Otherwise, a check is made in step 315 to see if the local-form identifier specified for this class using LOCAL-ID clause of CLASS configuration is already used for any other class. If so, error indication is made in step 320, and the routine exits at step 335. If not, in step 325 an entry for this class is made in the MOClassTable. The CStructureName field of this entry is set to the name specified in the DATA-TYPE clause, and the localFormClassId field is set to the value specified in the LOCAL-ID clause. In step 330, a ClassAttributeTable is created and the ClassAttributeTablePointer field in the MOClassTable entry is set to point to this table. The ClassAttributeTable contains class-specific attribute configuration information specified in the ATTRIBUTES clause of CLASS configuration specification. For each attribute included in the ATTRIBUTES clause, an entry is made in the ClassAttributeTable, setting the attributeLabel field to the attribute name. If the field-name for this attribute in the C structure is specified, it is stored in the fieldName field. Otherwise, the attribute-name is used as the corresponding field-name in the C structure. Finally, the routine exits at step 335.

Figure 10:
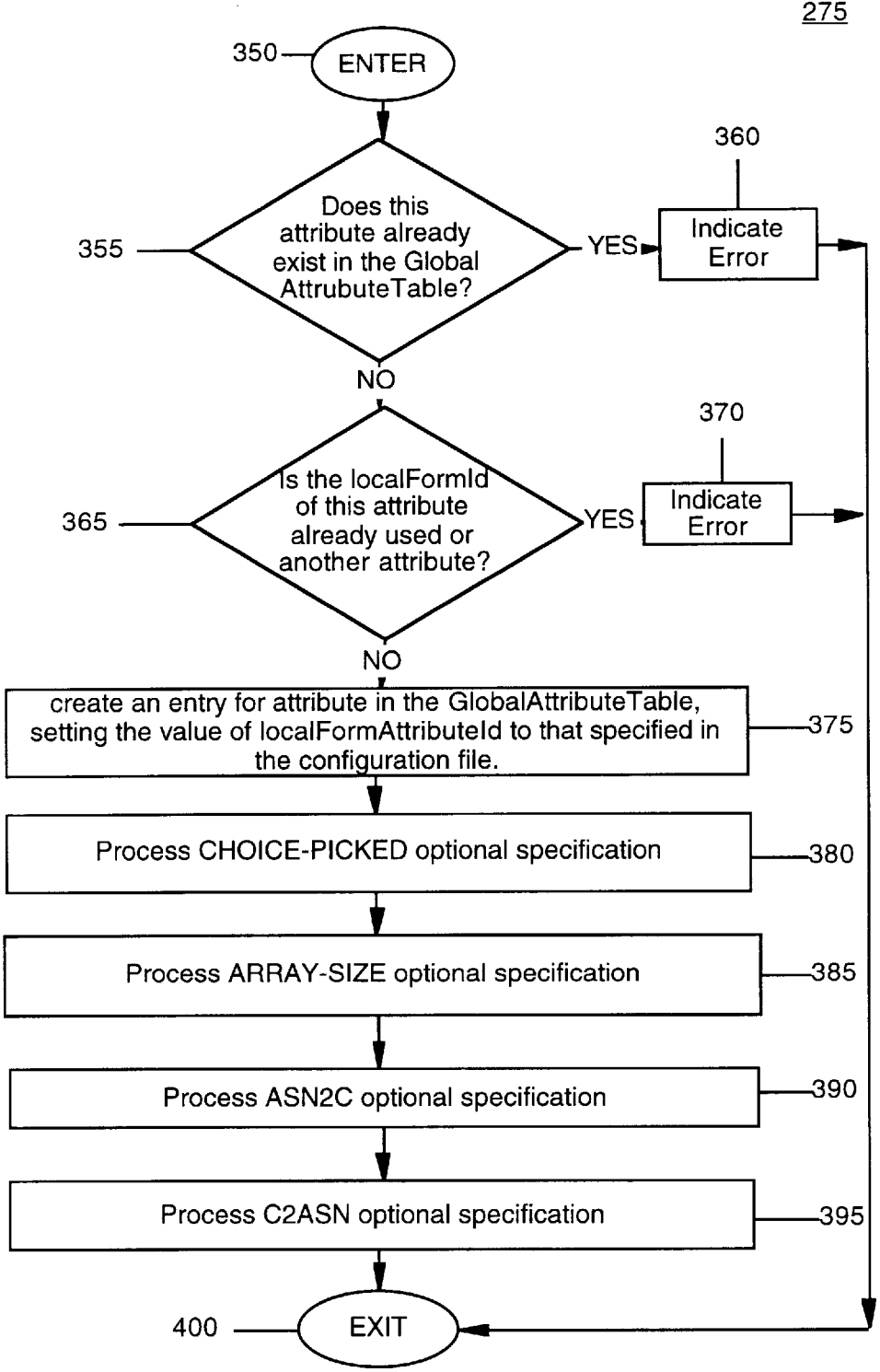
FIG. 10 is a flow chart showing the creation of an entry in the GlobalAttributeTable for an attribute as in step 275 of FIG. 7.

FIG. 10 shows in detail step 275 which makes an entry in the GlobalAttributeTable to store the information provided in the ATTRIBUTE specification. The routine begins at step 350. In step 355, a check is made to determine if an entry already exists for this attribute in the GlobalAttributeTable. If so, error indication is made in step 360, and the routine exits at step 400. Otherwise, step 365 checks to see if the local-form identifier specified in the LOCAL-ID clause is already used for another attribute. If so, an error indication is made in step 370, and the routine exits at step 400. Otherwise, in step 375, an entry for this attribute is created in the GlobalAttributeTable, The localFormAttributeField field is set to the value specified in the LOCAL-ID clause. The fieldType field is set to the C data type name specified in the FIELD-TYPE clause. The ASN.1 type for this attribute's value is obtained by looking up the GDMO meta data (generated by the GDMO compiler) for this attribute. In step 380, the optional CHOICE-PICKED clause for CHOICE types is processed, verifying whether the ASN.1 type for this attribute's value is of CHOICE type. Then in step 385, the optional ARRAY-SIZE clause is processed. In step 390, the optional ASN.1 to C conversion function specification is processed. Then, the optional C to ASN.1 conversion function specification is processed in step 395. The routine exits at step 400.

Figure 11:
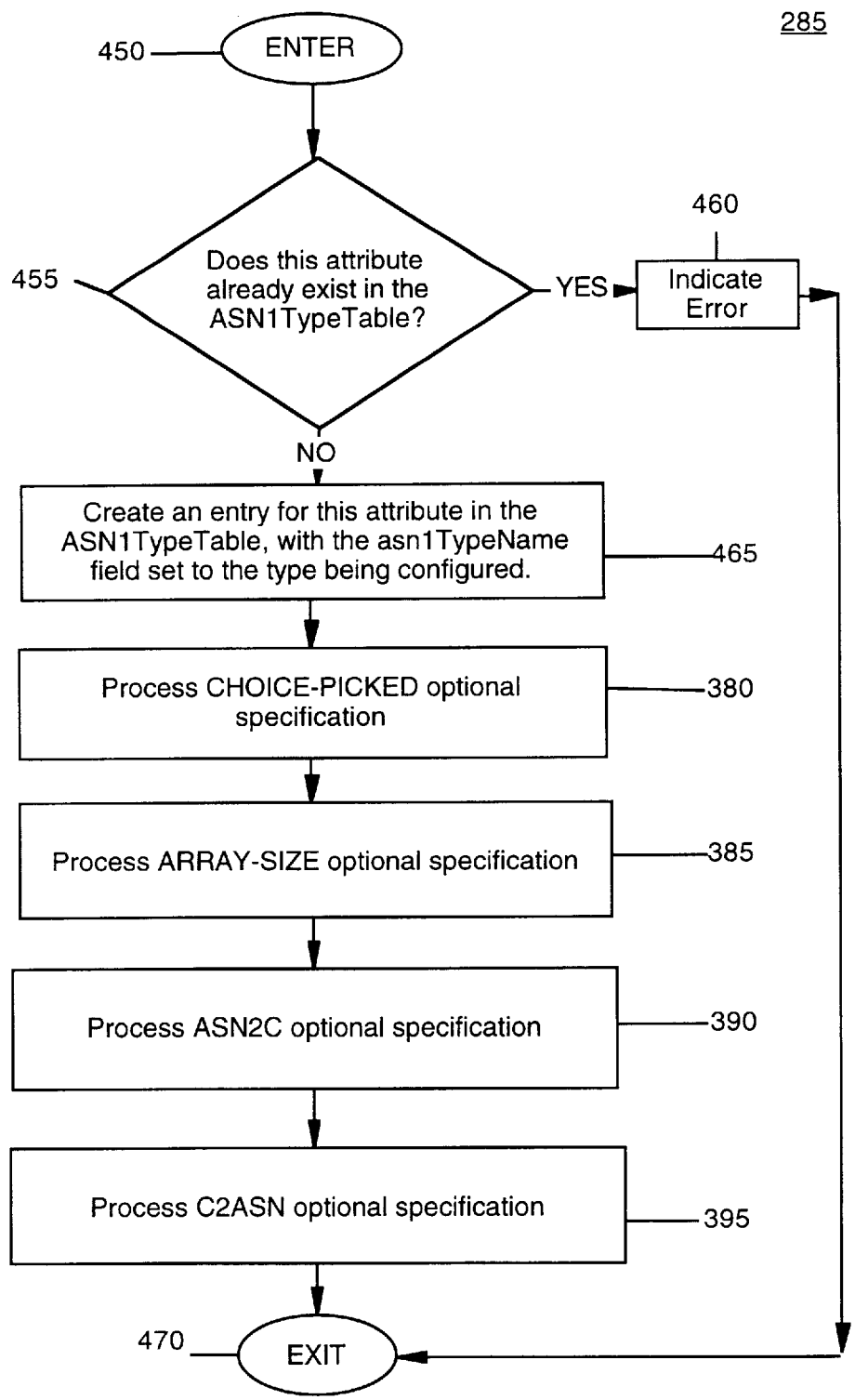
FIG. 11 is a flow chart showing the creation of an entry in the ASN1TypeTable for an ASN.1 type as in step 285 of FIG. 7.

FIG. 11 shows the process of adding the information provided in a TYPE specification to the ASN1TypeTable of step 285 in more detail. The routine starts at step 450. Step 455 checks if an entry for this ASN.1 type already exists in the ASN1TypeTable. If so, an error indication is made in step 460, and the routine exits at step 470. If not, control passes to step 465 where an entry for this attribute is created in the ASN1TypeTable. The fieldType field is set to the C data type name specified in the FIELD-TYPE clause. Control then reaches step 380 followed by steps 385, 390 and 395. These steps are the same as in FIG. 10. The routine exits at step 470.

Figure 12:
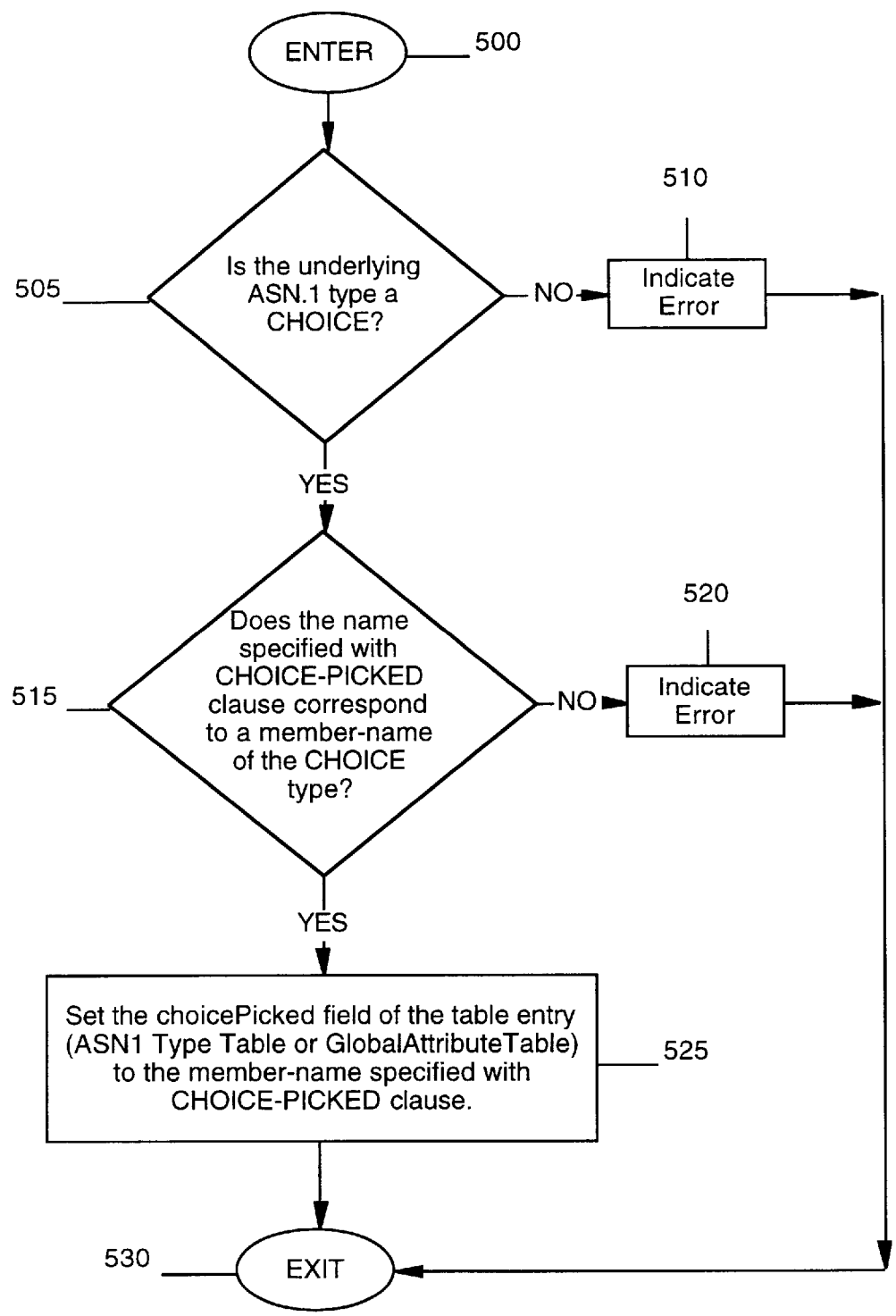
FIG. 12 is a flow chart showing processing of CHOICE-PICKED configuration specification as in step 380 of FIG. 10.

FIG. 12 shows step 380 of FIGS. 10 and 11 in greater detail. The routine begins at step 500. Step 505 checks if the ASN.1 type is a CHOICE type by consulting the meta data generated by the ASN.1 compiler. If this is not a CHOICE type, an error indication is made in step 510, and the routine exits at step 530. Otherwise control passes to step 515 which checks whether the member-name specified with the CHOICE-PICKED clause is a valid member-name for the current CHOICE ASN.1 type. If not, an error indication is made in step 520, and the routine exits at step 530. Otherwise, control passes to step 525. This step sets the choicePicked field of the appropriate table-entry (either ASN1TypeTable or GlobalAttributeTable) to the member-name specified in the CHOICE-PICKED clause. The routine exits at step 530.

Figure 13:
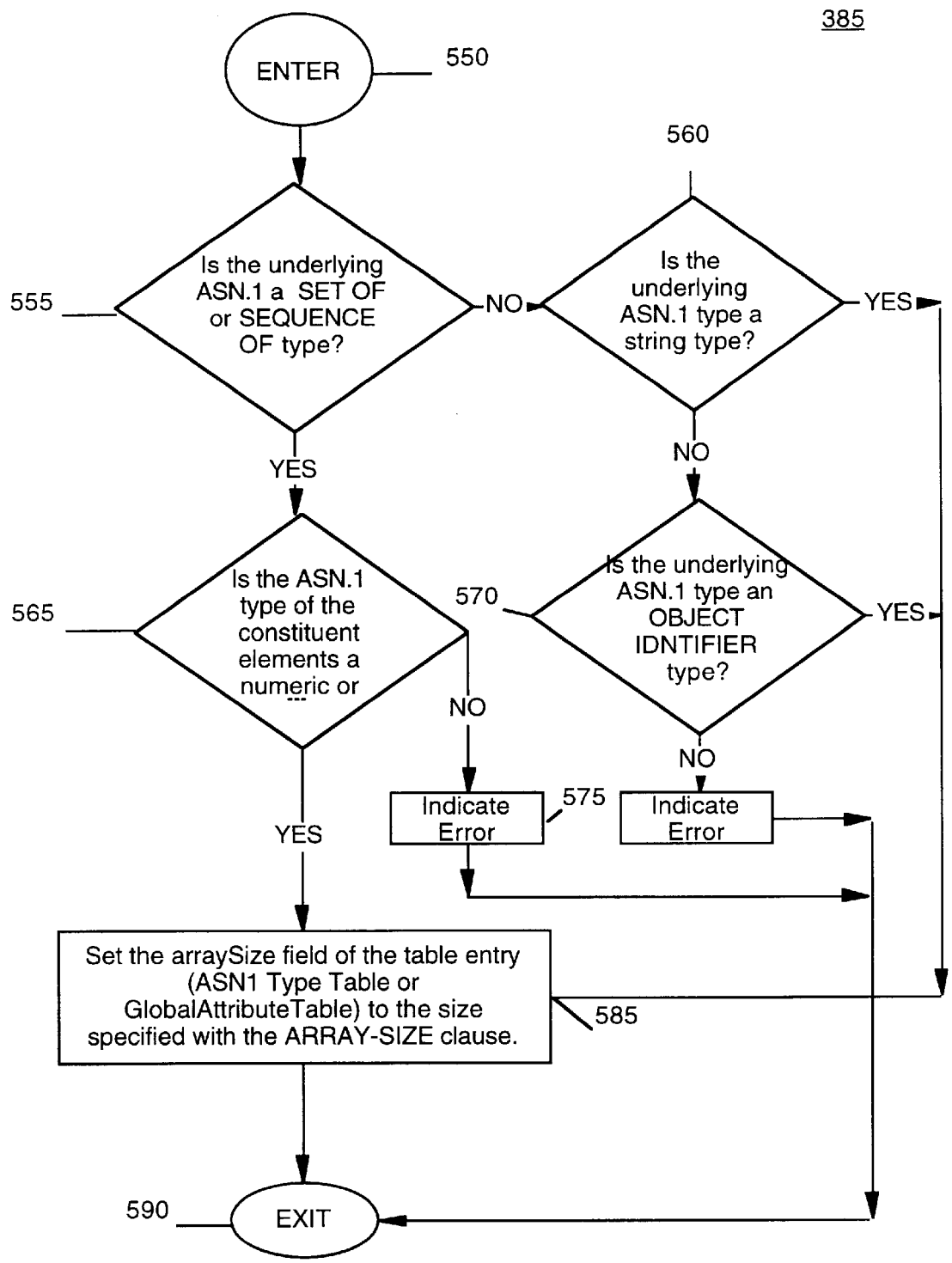
FIG. 13 is a flow chart showing processing of ARRAY-SIZE configuration specification as in step 385 of FIG. 10.

FIG. 13 shows step 385 of FIGS. 10 and 11 in more detail. The routine begins at step 550. In step 555, a check is made to see if the ASN.1 type is a "SEQUENCE OF" or a "SET OF" type. If so, control passes to step 565. If not, control reaches step 560. Step 560 checks if the ASN.1type is a String type. If so, control passes to step 585. If the ASN.1 type is not a String type, control passes to step 580 which checks if the ASN.1 type is an "OBJECT IDENTIFIER". If so, control goes to step 585. Otherwise an error indication is made in step 580 to inform the user that ARRAY-SIZE specification is not valid for this attribute or ASN.1 type, and the routine exits at step 590. If step 555 determines that the ASN.1 type is either a "SEQUENCE OF" or a "SET OF" type, control passes to step 565. Step 565 checks whether the constituent elements of this "SEQUENCE OF" or "SET OF" ASN.1 type are of numeric or boolean type. If not, the ARRAY-SIZE specification for this ASN.1 type is not valid, and an error indication is made in step 575, and the routine exits at step 590. Otherwise, control passes to step. Step 585 sets the arraySize field of the appropriate table-entry (ASN1TypeTable or GlobalAttributeTable entry) to the size specified with the ARRAY-SIZE clause. It also sets the bit corresponding to array-type in the flags field. The routine then exits at step 590.

Figure 14:
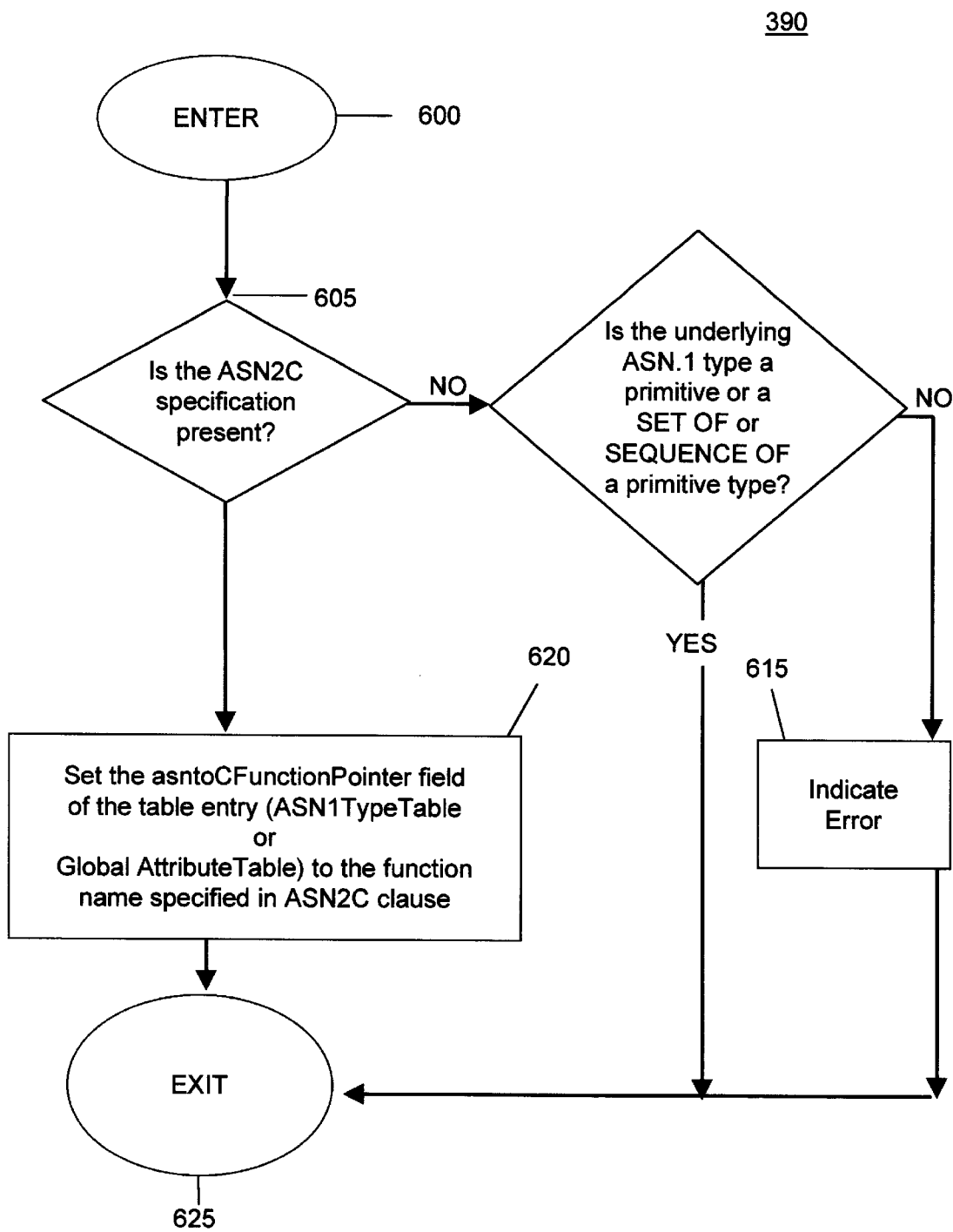
FIG. 14 is a flow chart showing processing of ASN2C configuration specification as in step 390 of FIG. 10.

FIG. 14 shows step 390 of FIGS. 10 and 11 in greater detail. This routine makes sure that an ASN2C conversion function is specified if translation of the underlying ASN.1 type to user's C data type requires special processing. The routine begins at step 600. In step 605, a check is made to see if the ASN2C clause is present in the attribute or ASN.1 type configuration. If so control passes to step 620. If not, control reaches step 610, which checks if the underlying ASN.1 type is a primitive or a "SEQUENCE OF"/ "SET OF" a primitive type. If so, no conversion functions are necessary and the routine exits at step 625. Otherwise, an error indication is made regarding a missing ASN2C clause in step 615, and the routine exits at step 625. Step 620 sets the asn1ToC_convFunction field to the conversion function name specified in the ASN2C clause. The routine exits at step 625.

Figure 15:
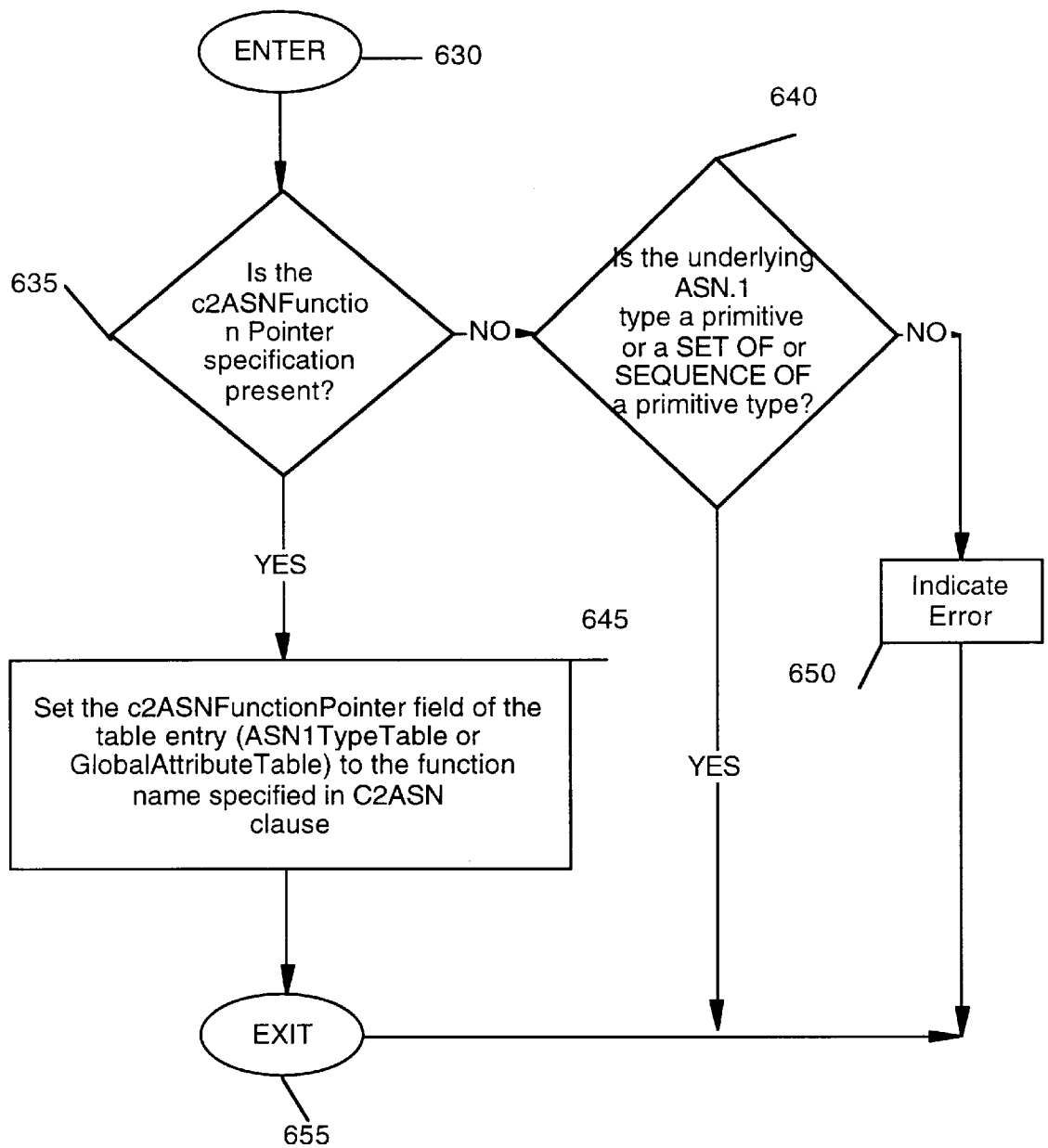
FIG. 15 is a flow chart showing processing of C2ASN configuration specification as in step 395 of FIG. 10.

FIG. 15 shows step 390 of FIGS. 10 and 11 in greater detail. The processing performed in this routine is similar to the one shown in FIG. 14, except that it processes the C2ASN conversion function specification instead of ASN2C. This routine makes sure that a C2ASN conversion function is specified if translation of the underlying ASN. 1 type to user's C data type requires special processing. The routine begins at step 630. In step 635, a check is made to see if the C2ASN clause is present in the attribute or ASN.1 type configuration. If so control passes to step 645. If not, control reaches step 640, which checks if the underlying ASN.1 type is a primitive or a "SEQUENCE OF"/ "SET OF" a primitive type. If so, no conversion functions are necessary and the routine exits at step 655. Otherwise, an error indication is made regarding a missing C2ASN clause in step 650, and the routine exits at step 655. Step 645 sets the c2asn1_convFunction field to the conversion function name specified in the C2ASN clause. The routine exits at step 655.

FIG. 16 shows step 220 in greater detail. This step generates MOClassTable in the translation-tables file or associated configuration specifications in a new configuration file. The routine begins at step 700. Step 705 checks whether the user provided a list of selected classes to the configuration program. If so, step 715 sets the class-list to the classes selected by the user, and passes control to step 720. Otherwise, step 710 sets the class-list to contain all the managed object classes present in the meta data generated by the GDMO compiler, and passes control to step 720. Step 720 retrieves each class in the class-list and passes control to step 722. Step 722 checks if all classes in the class-list are handled. If so, the routine exits at step 750. Otherwise, control goes to step 725. Step 725 checks if an entry for the current class already exists in MOClassTable. If so, control passes to step 735. Otherwise, control reaches step 730 where a default configuration is created for this MO class, and entered into the MOClassTable. Control then passes to step 735. Step 735 checks whether the user requested the configuration program to generate translation tables or a new configuration file. If the request is for generation of translation tables, control passes to step 740 which creates a translation table entry by copying the MOClassTable entry for the current class to the translation-tables file and passes control back to step 720 to generate translation-table entry for the next MO class in the class-list. If the request is for generation of a (new) configuration file, control goes to step 745 which generates a configuration specification for the current class using the information in the MOClassTable entry for the current class, and passes control back to step 720 to generate configuration specification for the next MO class in the class-list.

Figure 17:
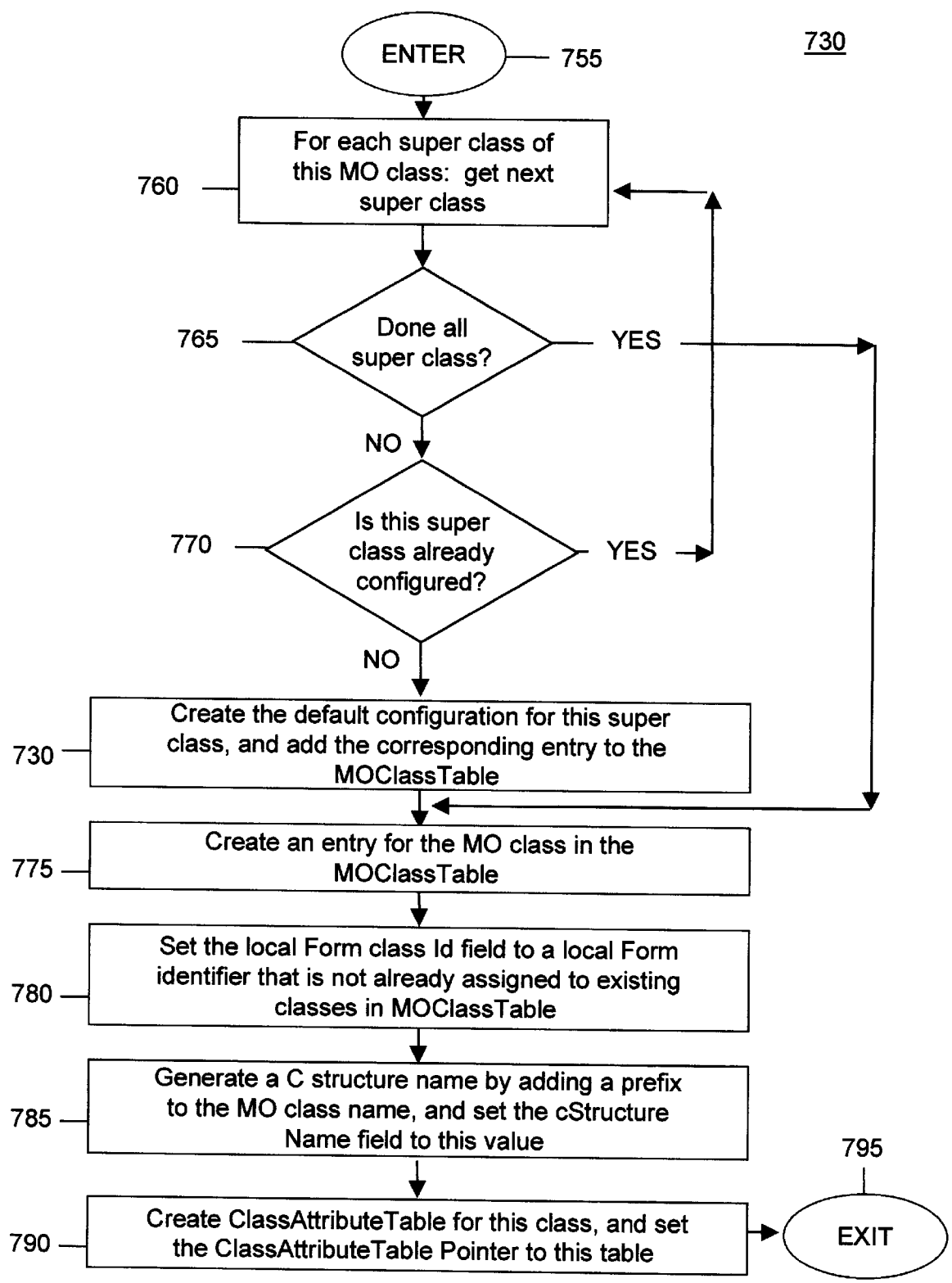
FIG. 17 is a flow chart showing the process of creating default configuration for an MO class as in step 730 of FIG. 16.

FIG. 17 shows step 730 which generates default configuration information for an MO class, in greater detail. The routine starts at step 755. Step 760 retrieves each super class of the current MO class for the purpose of copying relevant configuration information from the super class. Step 765 checks if all super classes are retrieved. If so, control passes to step 775. Otherwise, control reaches step 770 which checks if the super class is already configured. This is done by checking if an entry for this super class exists in the MOClassTable. If it is already configured, control goes back to step 760 to handle the next super class. Otherwise, this routine is recursively called by performing the processing of 730 on this super class. Then, the control goes to step 775. Step 775 creates an entry in the MOClassTable for the current MO class. Then, in step 780, the localFormClassId of this entry is set to a unique local-form identifier (integer). This can be done in several ways. One way is to keep the MOClassTable kept sorted on the localFormClassId field, and generate a new local-form identifier by simply adding 1 to the largest localFormClassId in the table. Next, in step 785, default C structure name for this MO class by adding a prefix to the MO class name is generated by adding a prefix (which may be specified by the user) to the MO class name. The CStructureName field is set to this generated name. Next, in step 790, a ClassAttributeTable is created for this class, and the ClassAttributeTablePointer field of this MOClassTable entry is set to point to this newly created ClassAttributeTable. The routine then exits at step 795.

Figure 18:
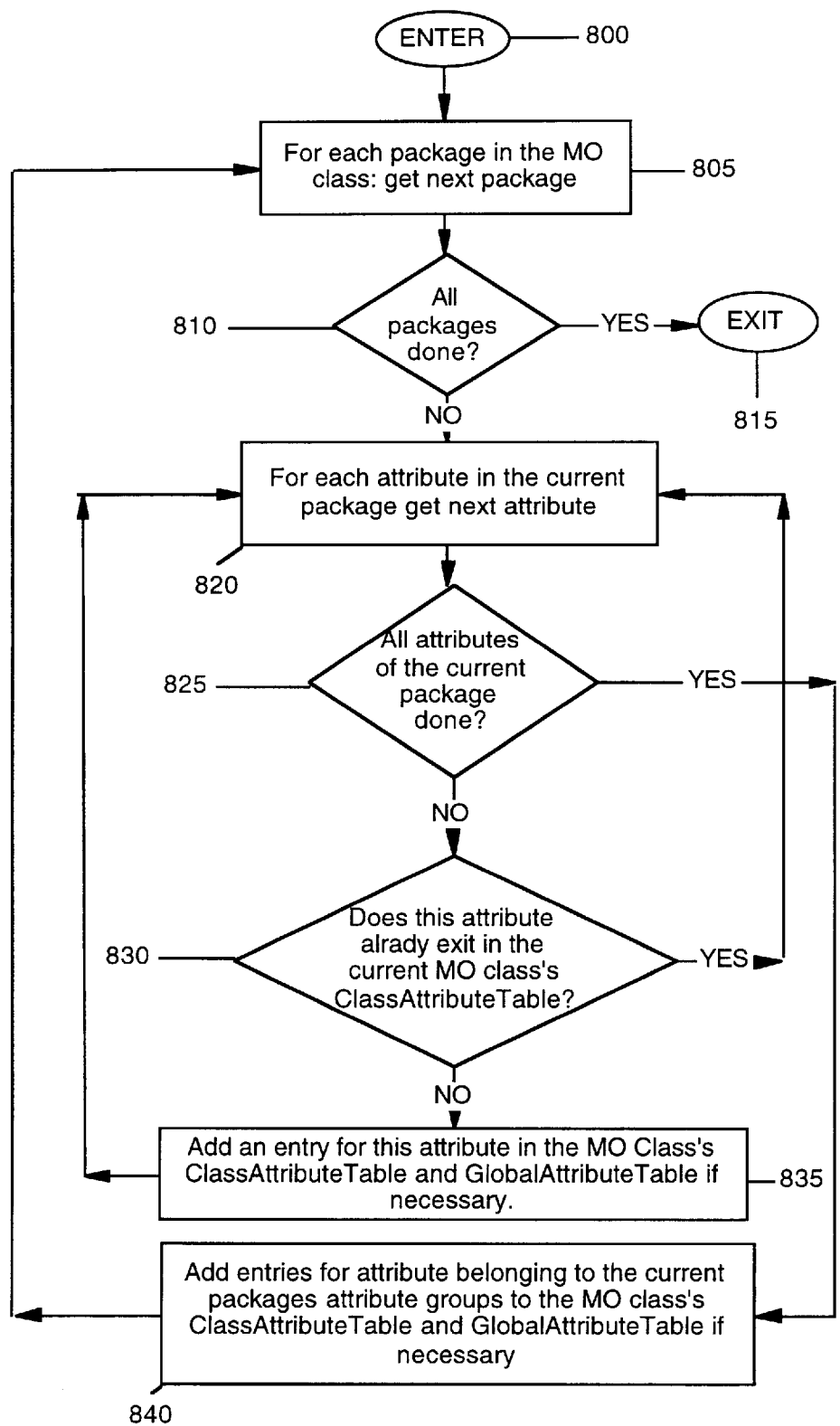
FIG. 18 is a flow chart showing the process of creating ClassAttributeTable for an MO class as in step 790 of FIG. 17.

Step 790 for creating a ClassAttributeTable is shown in greater detain in FIG. 18. The routine starts at step 800. Step 802 copies the ClassAttributeTable entries from each of the current MO class's super classes, avoiding copying of duplicate entries. If ClassAttributeTables of two different super classes contain entries for the same attribute and these two attributes are different, then a warning message is generated to alert the user, and only the entry from the first super class is copied into current MO class's ClassAttributeTable. Then, step 805 retrieves each package that is directly included (not inherited from super classes) in the MO class definition for the purpose of collecting all the attributes included in this package (either directly or via attribute-groups). Step 810 checks to see if all the packages of this MO classes are retrieved. If so, there are no more entries to be added to this class's ClassAttributeTable, and the routine exits at step 815. Otherwise, control passes to step 820 which retrieves each attributes of the current package. Step 825 checks if all attributes of the current package are handled. If so, control passes to step 840 to handle attributes included in the attribute-groups. Otherwise, control passes to step 825 which checks to see if an entry for this attribute already exists in the ClassAttributeTable of this MO class. If so, the current attribute is ignored, and control goes back to step 820 for handling next attribute in the current package. Otherwise, control reaches step 835 which creates an entry for the current attribute in the ClassAttributeTable. If no entry exists in the GlobalAttributeTable for the current attribute, an entry for the current attribute is added to the GlobalAttributeTable also, containing default attribute-configuration information. Control then passes back to step 820 for handling the next attribute in the current package. After all the attributes in the current package are handled, control reaches step 840 which creates necessary ClassAttributeTable and GlobalAttributeTable entries for the attributes included in the attribute-groups of current package. Entries for these attributes are created in a manner similar to steps 830 and 835. After step 840, control goes back to step 805 for handling attributes of other packages of this MO class.

Figure 19:
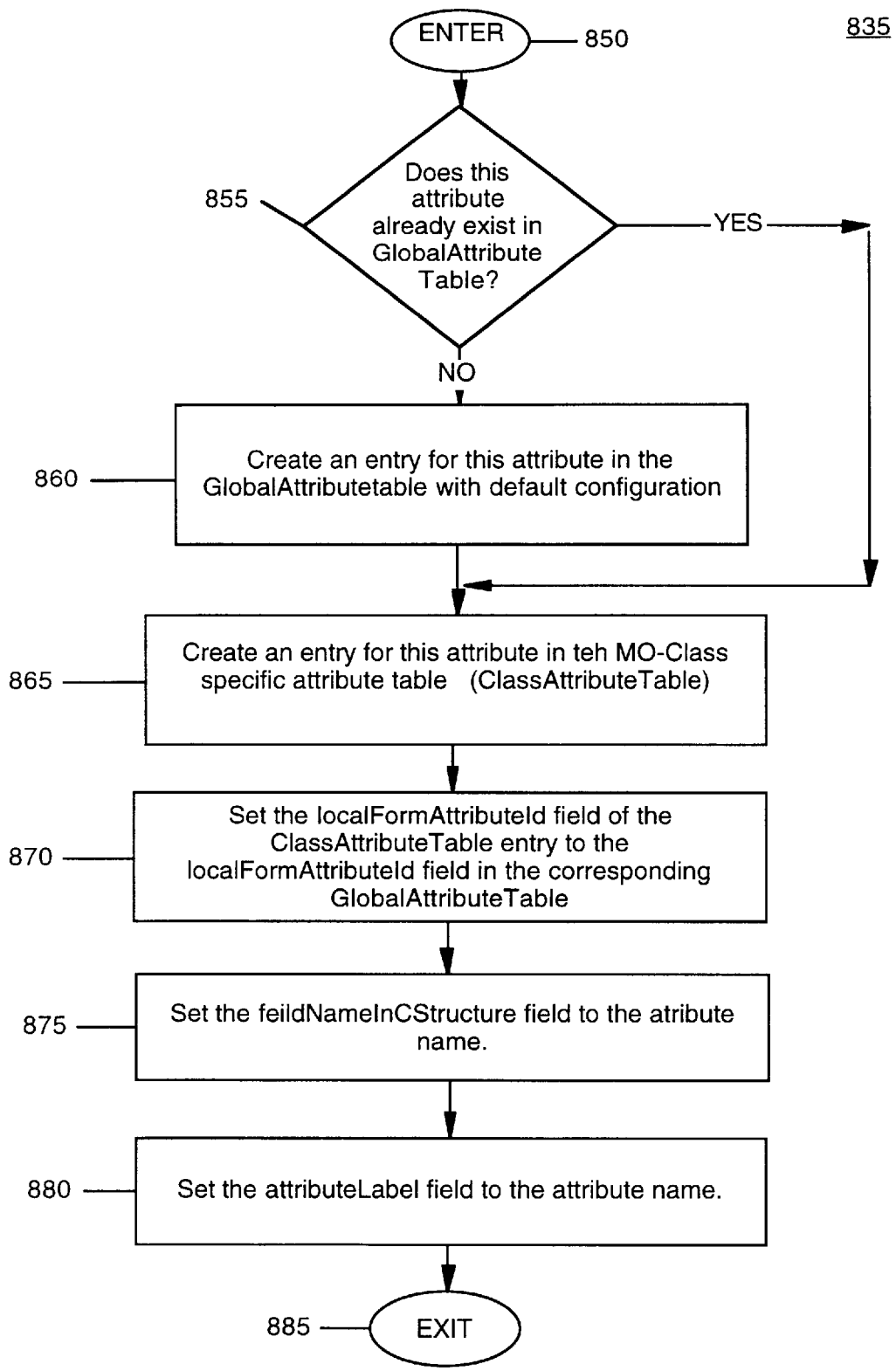
FIG. 19 is a flow chart showing the process of adding an entry for an attribute in the ClassAttributeTable as in step 835 of FIG. 18.

FIG. 19 shows step 835 which creates ClassAttributeTable and GlobalAttributeTable entries in greater detail. The routine begins at step 850. Step 855 checks whether the current attribute already exists in the GlobalAttributeTable. If so, control goes to step 865, bypassing creation of a GlobalAttributeTable entry of step 860. Step 865 adds a new entry to the current MO class's ClassAttributeTable. Then, step 870 sets the localFormAttributeId field of the ClassAttributeTable entry to the localFormAttributeId of the attribute's entry in the GlobalAttributeTable. Next, step 875 sets the fieldName field of the ClassAttributeTable entry to the default value of attribute-label. Then, in step 880, the attributeLabel field is se to the attribute-label. The routine exits at step 885.

Figure 20:
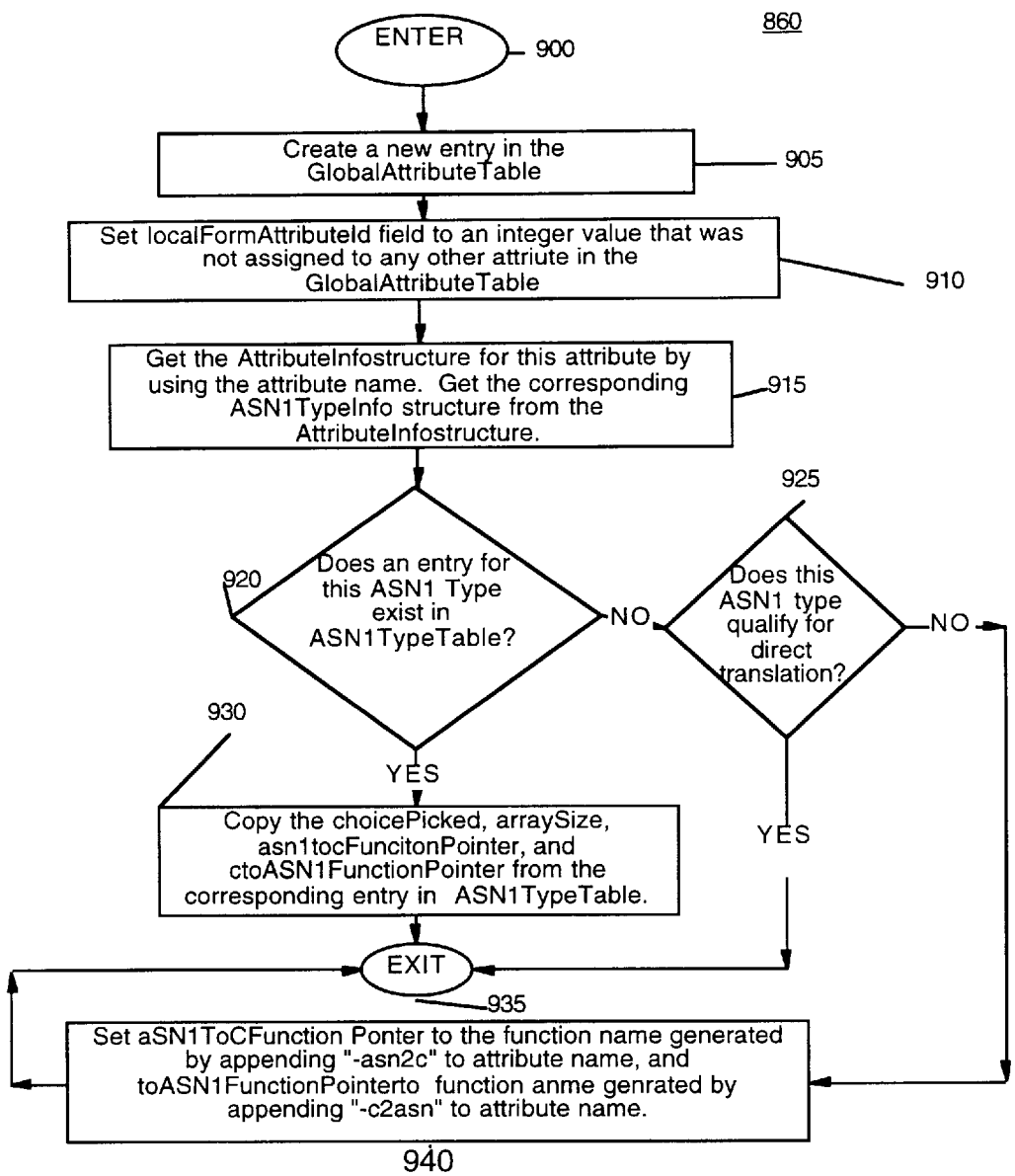
FIG. 20 is a flow chart showing the process of adding an entry for an attribute in the GlobalAttributeTable as in step 860 of FIG. 19.

FIG. 20 shows the step 865 in greater detail. This step creates the GlobalAttributeTable entry for an attribute and initializes it with default configuration information. The routine starts at step 900. Step 905 creates a new entry in the GlobalAttributeTable. In step 910, a unique local-form identifier (one that is not already used for any other entry in the GlobalAttributeTable) is assigned to the localFormAttributeId of the current attribute's entry. Step 910 retrieves the AttributeInfo for the current attribute by looking up the meta data generated by the GDMO compiler. From the AttributeInfo structure, the Asn1TypeInfo structure containing the type-information for this attribute's value is obtained. Then, in step 920, a check is made to see if an entry for this ASN.1 type exists in the ASN1TypeTable. If so, control passes to step 930, where the choicePicked, arraySize, asn1ToC_convFunction, cToAsn1_convFunction, and the flags fields of the GlobalAttributeTable entry are set to the corresponding values in the ASN1TypeTable entry. The routine then exits at step 935. If there is no entry for this ASN.1 type in the ASN1TypeTable, then step 925 determines if this ASN.1 type qualify for direct translation of attribute values from ASN.1 to C and C to ASN.1 forms without any need for custom conversion functions. See FIG. 25 for details on what ASN.1 types are translated without needing custom conversion functions. If this ASN.1 type qualifies for direct translation, the routine exits at step 935. Otherwise, control passes to step 940 which initializes the asn1ToC_convFunction to the function name derived from the attribute-label by appending "_asn2c" to the attribute-label, and the cToAsn1_convFunction to the function name by adding "_c2asn" suffix to the attribute-label. (These custom translation functions provided by the user get called automatically when the translator module performs translations of various CMIP PDUs into user-designed C structures, automatically.) The routine then exits at step 935.

FIG. 21 shows the step 225 in greater detail. This step either creates the GlobalAttributeTable in the translation-tables file or generates the new configuration specifications for necessary attributes in the configuration file by using the GlobalAttributeTable built in memory. The in-memory GlobalAttributeTable gets built when the input configuration file is processed (step 215), or, when the MO Class Table is generated in step 220. The routine in FIG. 21 starts at step 950. Step 955 retrieves each entry in the in-memory GlobalAttributeTable. Step 960 checks if all entries in the GlobalAttributeTable are processed. If so, the routine exits at step 965. If not, control passes to step 970 which checks whether the user requested generation of translation-tables or a new configuration file. If the request is for translation-tables, control passes to step 975. Step 975 creates a GlobalAttributeTable entry in the translation table for the current attribute by copying the configuration information for this attribute from the in-memory GlobalAttributeTable. Control then goes back to step 955 for handling the next attribute entry in the GlobalAttributeTable. If the user's request to the configuration program was to create a new configuration file, control goes to step 980. Step 980 checks whether the GlobalAttributeTable entry is properly initialized with information the useful for translation process. In some situations some GlobalAttributeTable entries will have only their localFormAttributeId field initialized, and the rest of the fields not initialized. This may happen if no input configuration information is available for this attribute, so default configuration is generated for the underlying ASN.1 type only (i.e., in the ASN1TypeTable entry only). Since many other attributes may use the same ASN.1 type for their values, it is advantageous to only configure the ASN.1 type, and propagate that configuration information to all attributes that use the same ASN.1 type in the next run of the configuration program. If one such attribute needs a different way of translating to or from the C data structure field, then the just the configuration specification for that one attribute needs to be changed while the rest of the attributes having the same underlying ASN.1 type can share the same translation mechanisms. In step 980, if it is determined that the current GlobalAttributeTable entry is not completely initialized, then this attribute configuration is skipped, and control passes back to step 955 for handling the next entry in the table. Otherwise, control goes to step 985 which generates an ATTRIBUTE configuration specification for this attribute using the information from the GlobalAttributeTable entry. Then, control passes back to step 955 for handling the next entry in the table.

FIG. 22 shows step 230 in greater detail. This step either creates ASN1TypeTable in the translation-tables file by copying information from the in-memory ASN1TypeTable, or, generates TYPE configuration specifications in the configuration file. The routine in FIG. 22 starts at step 1000. Step 1005 retrieves each entry in the ASN1TypeTable. Step 1010 checks whether all entries in the ASN1TypeTable are processed. If so, the routine exits at step 1015. Otherwise, control passes to step 1020 which checks whether the user requested generation of translation-tables file or a new configuration file. If the request is for the generation of translation-tables, control passes to step 1025 which creates an ASN1TypeTable entry in the translation-tables file by copying the information from the in-memory ASN1TypeTable entry. Control then passes back to step 1005 for processing the next entry in the ASN1TypeTable. If the user's request was for generation of a new configuration file, control goes to step 1030 which generates a TYPE configuration specification for the current ASN.1 type by using the information in the in-memory ASN1TypeTable entry. Control then goes back to step 1005 for handling the next entry in the ASN1TypeTable.

6. Description of Flow Charts for Performing Translation between CMIP Arguments and User's Data Structures FIGS. 23a through 28 show the process of translating a CMIP PDU to the corresponding managed object class's user-designed C structure making use of the translation-tables generated by the configuration program, incorporating user's preferences on data types and translation methods. These figures illustrate the conversion of attribute-data in a CMIP CreateArgument. The translations to or from user-designed C structures to other CMIP PDUs are similar and hence are not explicitly shown in flow charts. Differences in handling other CMIP PDUs are noted at the end of this section.

Figure 23:
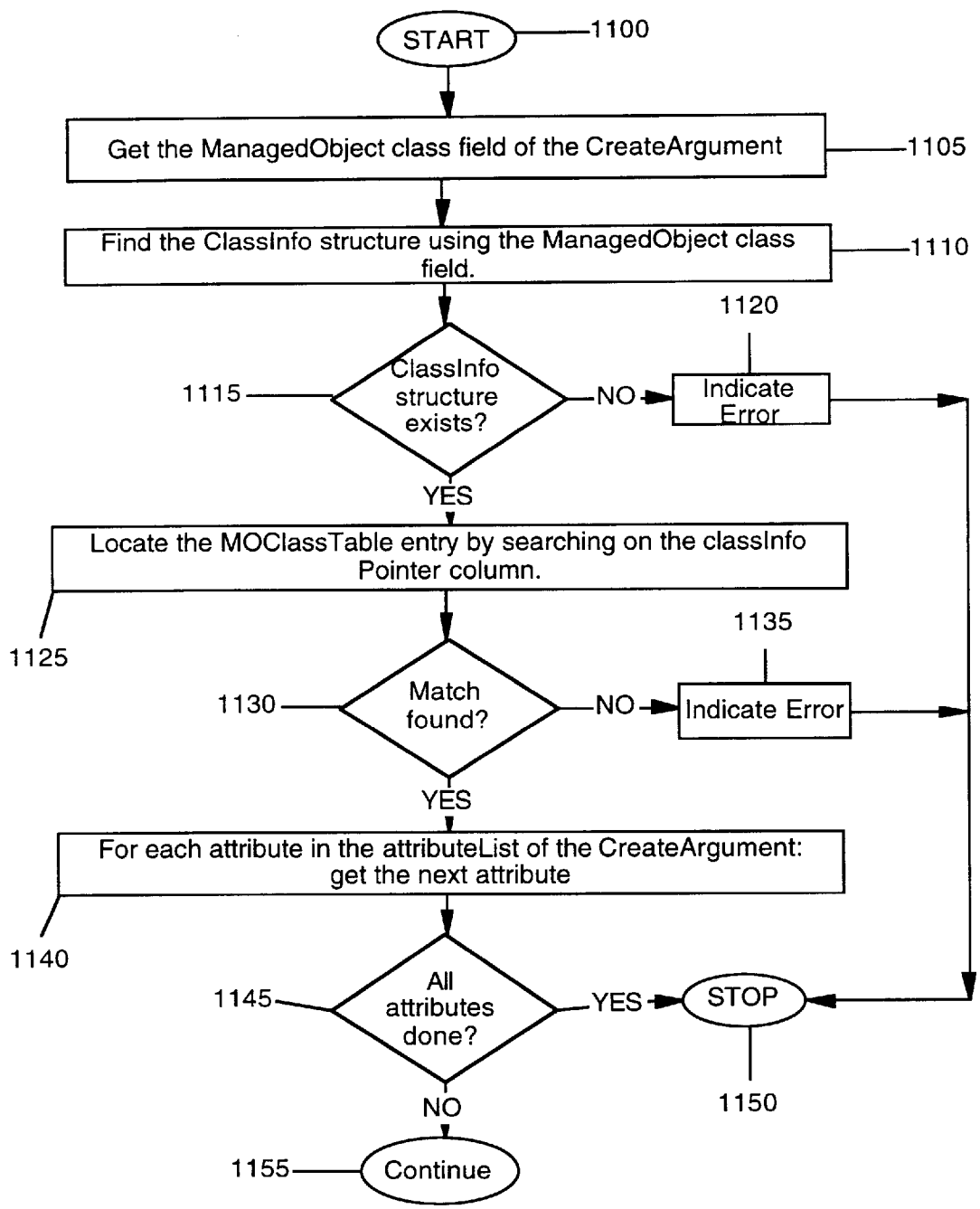
FIGS. 23a and 23b show the process of translating a CMIP CreateArgument into customized C structures.
Figure 23B:
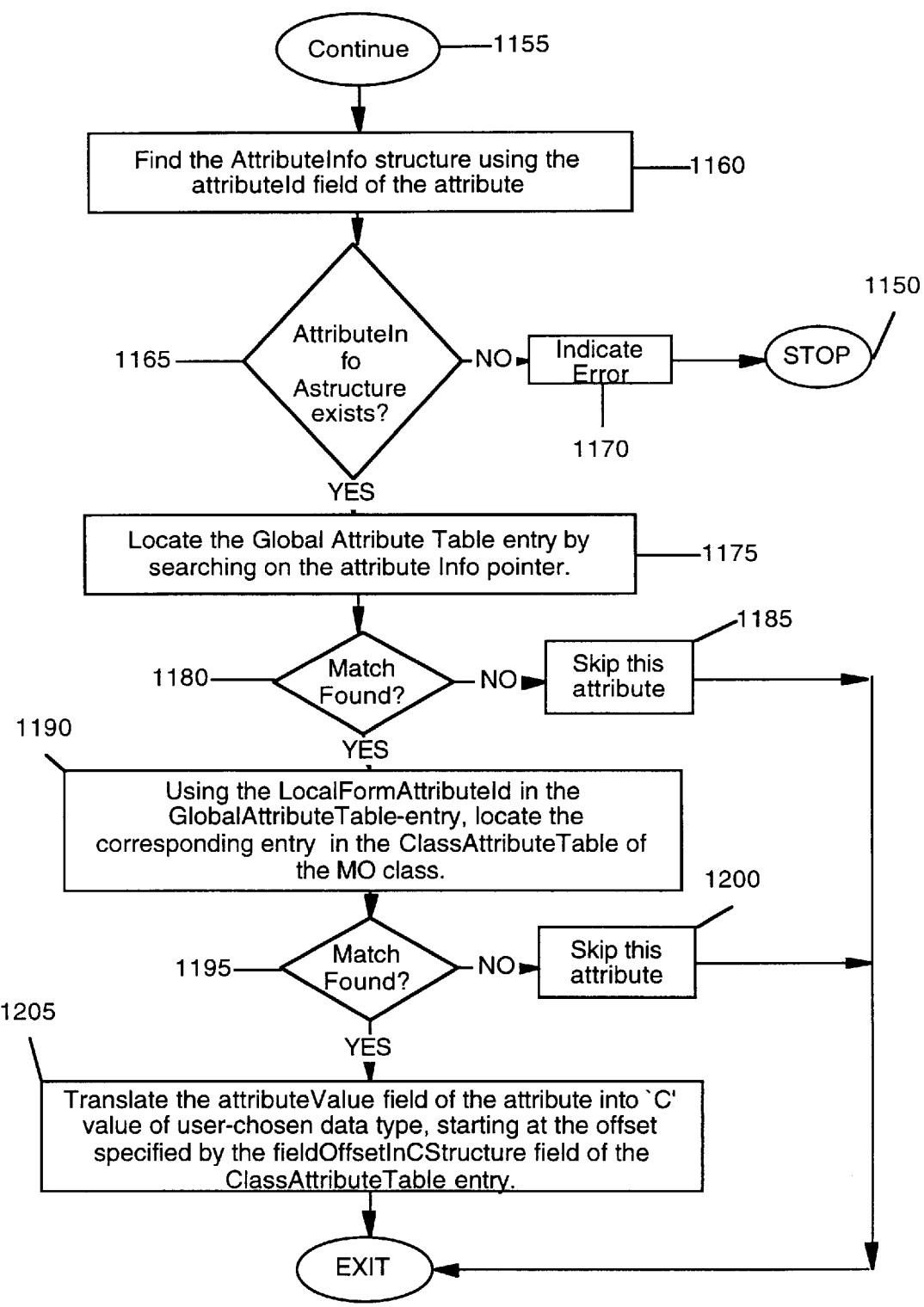

FIGS. 23a and 23b show the overall translation process of a CMIP CreateArgument into the user-designed data structure associated with the managed object class of the MO specified in the CreateArgument. The translation process starts at step 1100. Step 1105 fetches the object-identifier of the MO class from the managedObjectClass field of the CreateArgument. Next, in step 1110, the ClassInfo structure for this MO class is obtained by searching the meta data generated by the GDMO compiler, using the managedObjectClass as a key. Step 1115 checks whether step 1110 was successful in locating the ClassInfo structure for the MO class specified in the CreateArgument. If so, control passes to step 1125. Otherwise, appropriate error indication is given in 1120, and the routine exits at step 1150. In step 1125, the MOClassTable (generated by the configuration program) is searched for the matching entry. The search may be performed using the ClassInfoPointer as the key. Step 1130 checks whether the search in step 1125 was successful. If so, the control passes to step 1140. If not, an error indication is given in step 1135, and the routine exits at step 1150. Step 1140 retrieves each attribute specified in the attributeList field of the CreateArgument. Step 1145 checks whether all attributes in the attributeList are processed. If so, the routine exits at step 1150. Otherwise, the translation procedure continues to step 1155 and then to step 1160. Step 1160 searches looks up the GDMO meta data using the attributeId of the current attribute in the attributeList of the CreateArgument for retrieving the associated AttributeInfo structure. Step 1165 checks whether the search in step 1160 is successful. If so, control passes to step 1175. Otherwise, appropriate error indication is given in step 1170, and the routine exits at step 1150. Step 1175 searches the GlobalAttributeTable for an entry whose AttributeInfoPointer points to the AttributeInfo structure looked up in step 1160. Step 1180 checks whether a matching GlobalAttributeTable is found. If so, control passes to step 1190. Otherwise, control goes to step 1185. If an attribute is not present in the GlobalAttributeTable, it implies that the user does not want to represent this attribute in his/her data structure. Hence, the translator ignores this attribute, and passes control back to step 1140 for translating the next attribute in the attributeList. Step 1190 searches the ClassAttributeTable pointed-to by the ClassAttributeTablePointer of the MOClassTable entry (which was located in step 1125), using the localFormAttributeId of the GlobalAttributeTable entry (located in step 1175). The ClassAttributeTable entry is used to get the offset of the corresponding field for this attribute in the userdesigned data structure for this MO class. The fieldOffset field of the ClassAttributeTable entry provides this offset information. Step 1195 checks whether the search for a matching entry in the ClassAttributeTable entry done in step 1190 is successful. If so, control passes to step 1205. If not, control passes to step 1200. Failure of this search means that the user is not interested in storing this attribute'value in his/her data structure for this class, but, he/she may be interested in storing this attribute value in the data structures for some other class that contains this attribute. The translator ignores this attribute, and passes control back to step 1140 for translating the next attribute in the attributeList. Step 1205 translates the attributeValue field of the current attribute in the attributeList into user-chosen C data type that is stored at a location starting at fieldOffset bytes into the data structure.

Figure 24:
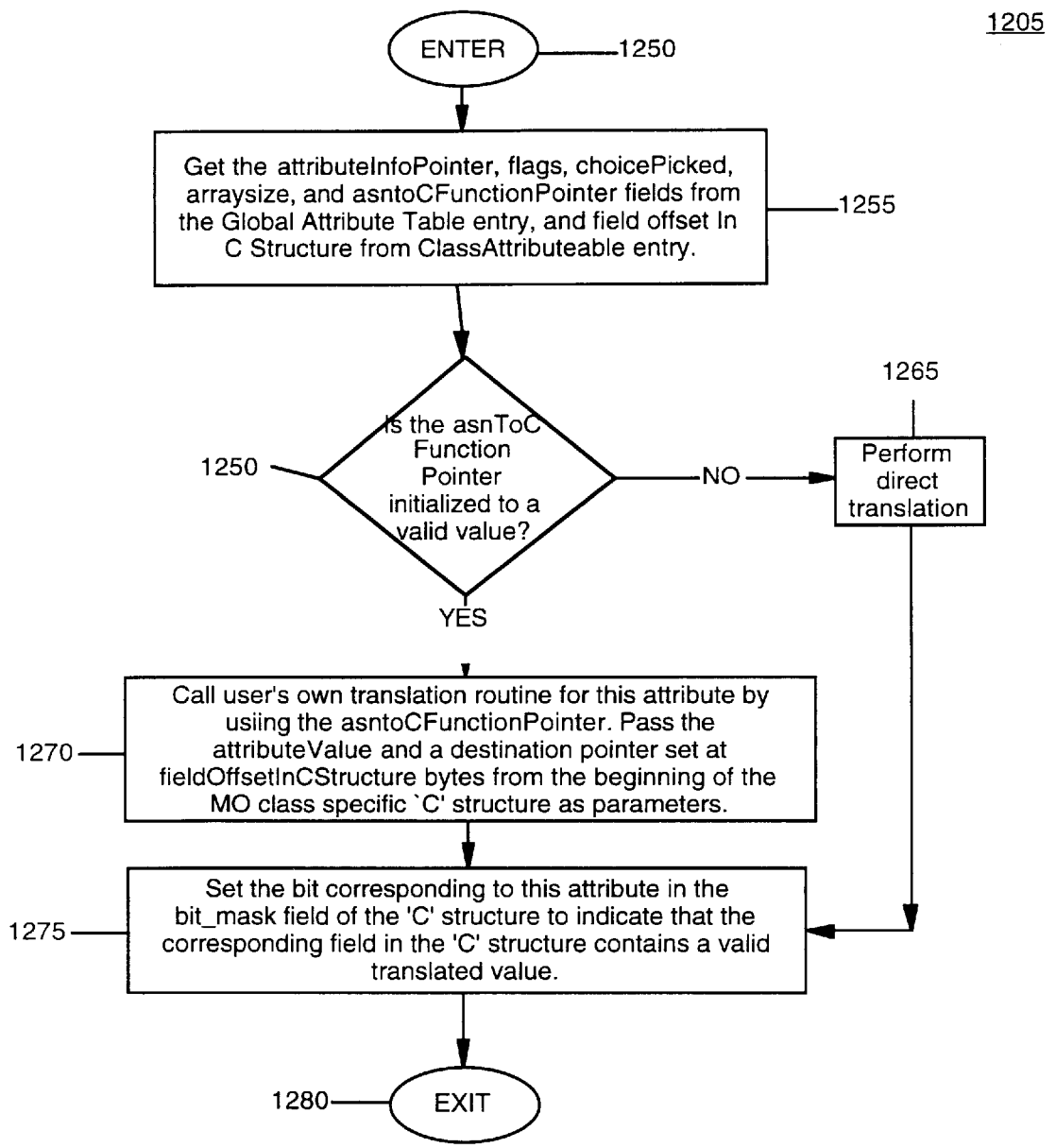
FIG. 24 is a flow chart showing the process of translating an attribute value into the corresponding field in the customized C structure as in step 1205 of FIG. 23b.

FIG. 24 shows step 1205 in greater detail. This step translates an attribute value into user-chosen data type and into the appropriate field in the data structure associated with the managed object class. The routine starts at step 1250. In step 1255, all relevant information is collected from the various translation-table entries located in earlier steps. This includes AttributeInfoPointer, flags, choicePicked, arraySize and asn1ToC_convFunction fields from the GlobalAttributeTable entry, and, fieldOffset field from the ClassAttributeTable entry. Step 1260 determines whether an ASN-to-C conversion function is specified for this attribute, by checking whether the asn1ToC_convFunction field is initialized to a valid function name. If so, control passes to step 1270 which calls user's own translation method using the asn1ToC_convFunction field. The attributeValue and a pointer to the appropriate field in the user-designed structure of this class (this pointer is computed by adding the fieldOffset value to the address of the user's C structure). Control then passes to step 1275. If no special ASN-to-C conversion function is specified, control passes to step 1265 from step 1260. Step 1265 performs direct translation, and passes control to step 1275. Step 1275 sets the a bit in the bit_mask field to indicate that the corresponding field in the user's data structure is initialized with the translated attribute value. The position of the bit in the bit_mask corresponds to the position of the corresponding attribute's entry in the ClassAttributeTable. The bit_mask thus serves the purpose of informing the user as to what fields in the user's data structure actually contain valid values. The routine then exits at step 1280.

Figure 25:
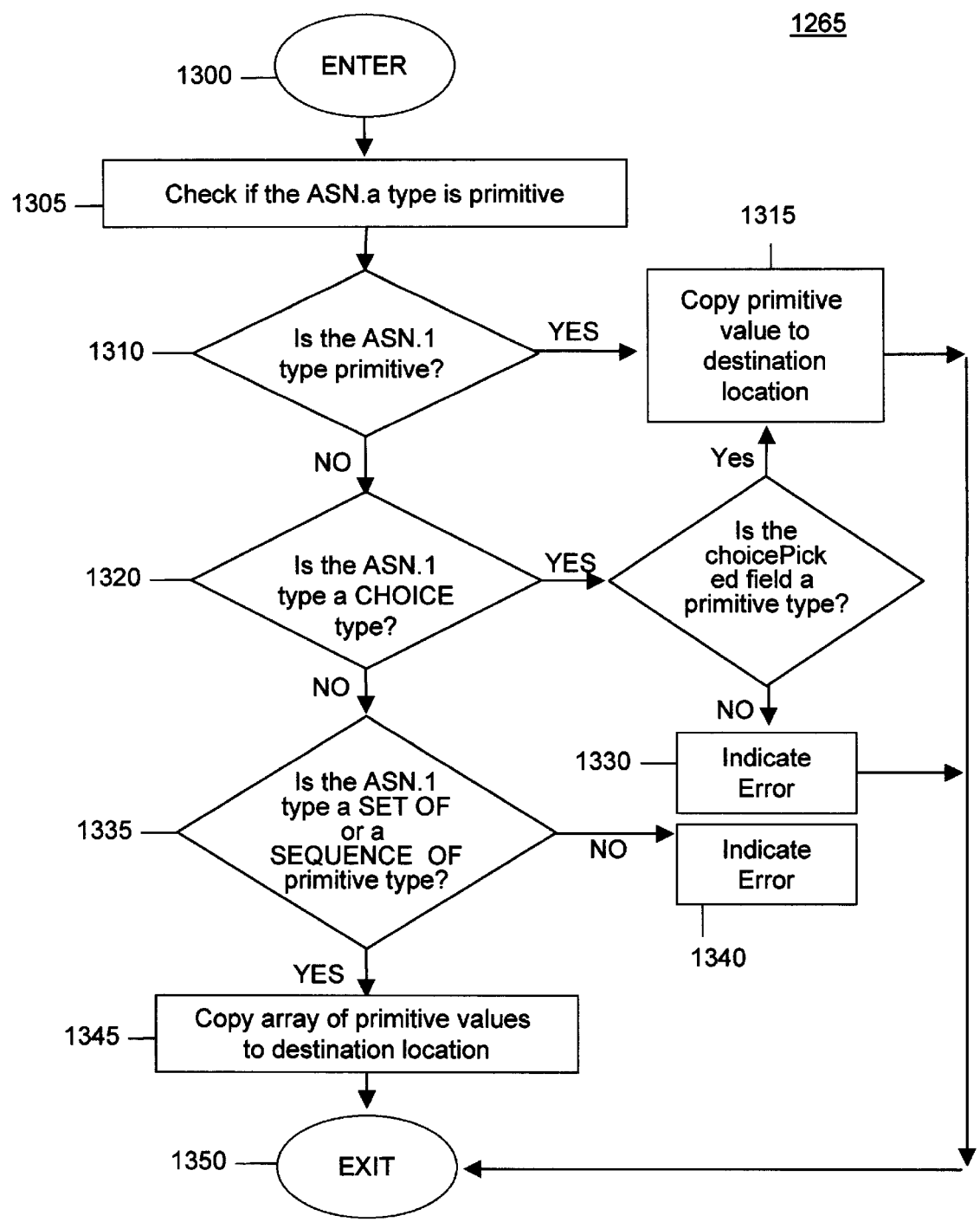
FIG. 25 is a flow chart showing the process of direct translation of an attribute value to its corresponding field in the customized C structure as in step 1265 of FIG. 24.

FIG. 25 shows step 1265 in greater detail. This step performs direct translation of an attribute value into user's data type, and into appropriate location inside user's MO class specific data structure. The routine begins at step 1300. Step 1305 checks if the ASN.1 type is primitive for the purpose of direct translation. See FIG. 26 for details on the ASN.1 types for which direct translation is supported. If the ASN.1 type is primitive, step 1310 passes control to step 1315, otherwise to step 1320. Step 1315 copies the primitive attribute value to the destination location (computed using the fieldOffset value in step 1255) and the routine exits at step 1350. Step 1320 checks if the ASN.1 type is a CHOICE type. If so, step 1325 checks if CHOICE-PICKED configuration is available for this attribute and if the choice-member picked in the attribute value matches the member given by the choicePicked field of the GlobalAttributeTable entry, and if the ASN.1 type of this picked member is primitive. If all these conditions are true, control is passed to step 1315 for copying this primitive member value to the appropriate field in user's data structure. Otherwise, an error indication is given in step 1330, and the routine exits at step 1350. If the ASN.1 type of the attribute is not a CHOICE type, control goes to step 1335 (from step 1320). Step 1335 checks if the attribute's ASN.1 type is either a "SET OF" or a "SEQUENCE OF" a primitive type. If so, control passes to step 1345. If not, an error indication is given in step 1340, and the routine exits at step 1350. Step 1345 copies array of primitive values to the appropriate field in user's data structure, and the routine exits at step 1350.

Figure 26:
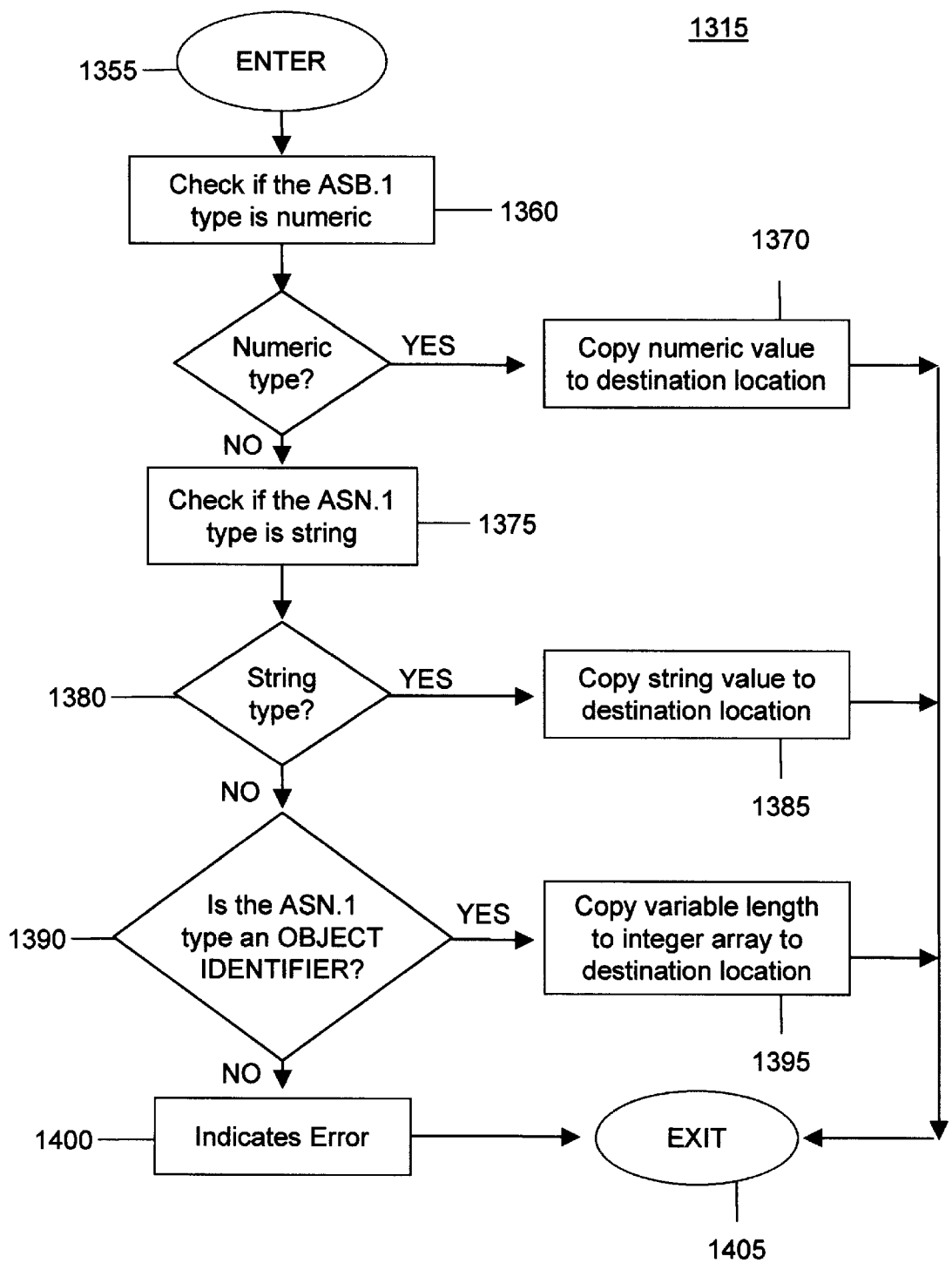
FIG. 26 is a flow chart showing the process of translating a primitive typed attribute value to its corresponding field in the customized C structure as in step 1315 of FIG. 25.

FIG. 26 shows step 1315 in greater detail. This step copies primitive values from ASN.1 data to into appropriate fields in user's data structure. The routine starts at step 1355. Step 1360 checks if the ASN.1type is numeric. If it is a numeric type, step 1365 passes control to step 1370 for copying numeric value to the destination field in the user's data structure. If not, control is passed to step 1375 which checks whether the attribute's type is an ASN.1 string. If so, step 1380 passes control to step 1385 which copies string value to the destination field in the user's data structure. If the ASN.1 definition for this type specifies a fixed-length string, then the data is directly copied from the attribute-value to the destination location. If this is defined as a variable-length string, then the arraySize field of the GlobalAttributeTable entry is checked to see if it specifies a maximum array size for the destination character array. (The maximum size is specified if the arraySize value is non-zero.) If the maximum array size is specified, and the length of the input ASN.1 string is smaller than or equal to the arraySize value, the attribute-value is directly copied from the attribute-value to the destination field. If the length is greater than this value, an error indication is given, and the routine exits at step 1405. If a variable-length array is to be used for storing the string value, then, new memory is allocated (if necessary) to copy the string attribute-value, the string value is copied from the input ASN.1 string, and a pointer to this memory and the length of the string are saved in the destination field. If the attribute's syntax is not of ASN.1 string type, step 1380 passes control to step 1390. Step 1390 checks whether the ASN.1 type of the attribute is of "OBJECT IDENTIFIER" type. If so, control is passed to step 1395 which copies the object-identifier value in the input ASN.1 data to an integer array. This process is similar to copying variable-length string values discussed above, except for the difference in the types and sizes of the constituent array-elements. If the ASN.1 type of the attribute is not an "OBJECT IDENTIFIER", then this ASN.1 type does not qualify for direct translation of values, and an error indication is given in step 1400, and the routine exits at step 1405.

Figure 27:
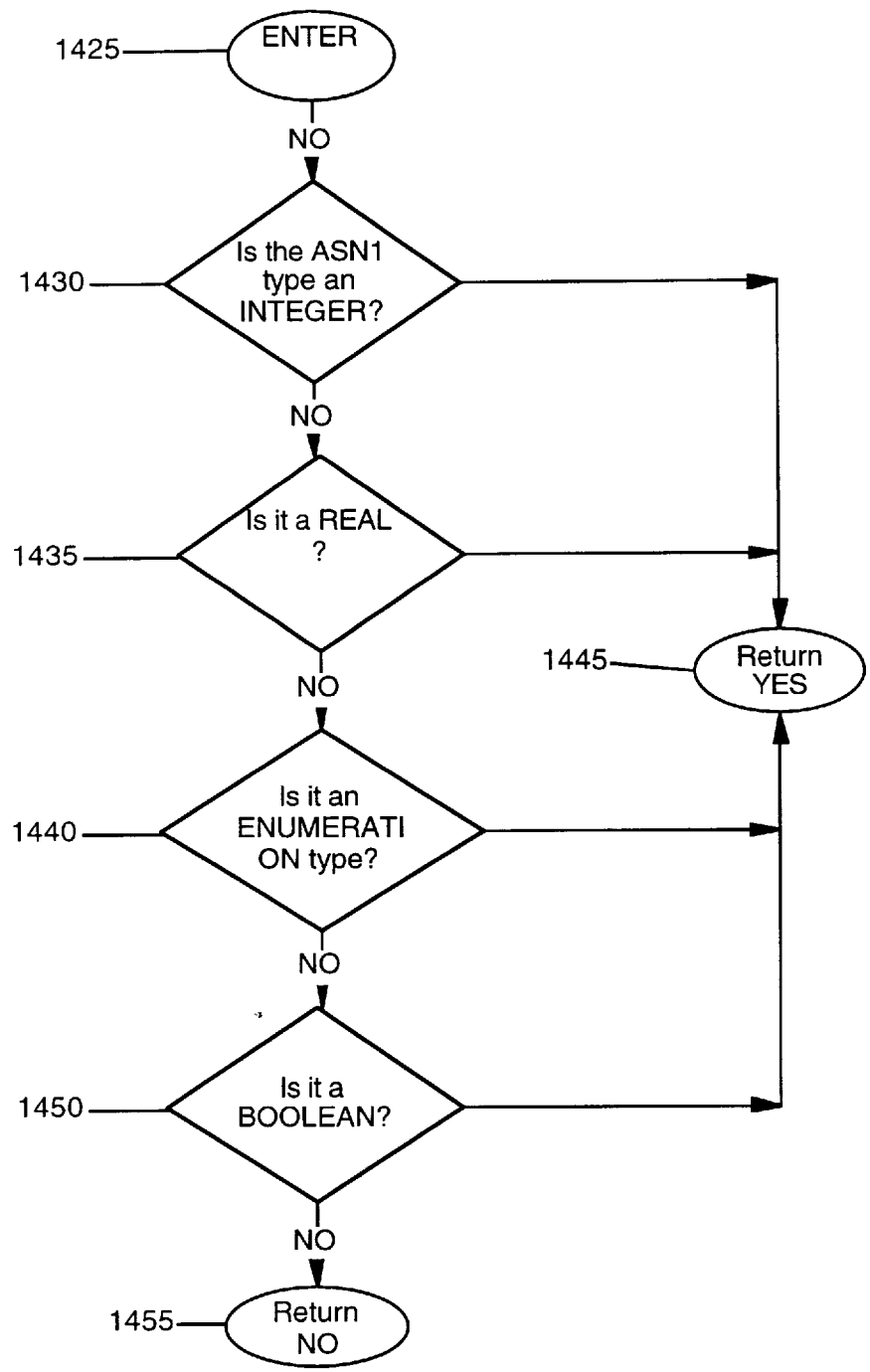
FIG. 27 is a flow chart showing the process of determining whether an attribute's value is of a numeric type as in step 1360 of FIG. 26.

FIG. 27 shows the process of determining whether an ASN.1 type is a numeric type. This corresponds to step 1360 in FIG. 26. The routine begins at step 1425. The routine returns an YES if the ASN.1 type is an INTEGER, or a REAL, or an ENUMERATION, or a BOOLEAN type. If the ASN.1 type is not of any of these types, then the routine returns a NO.

Figure 28:
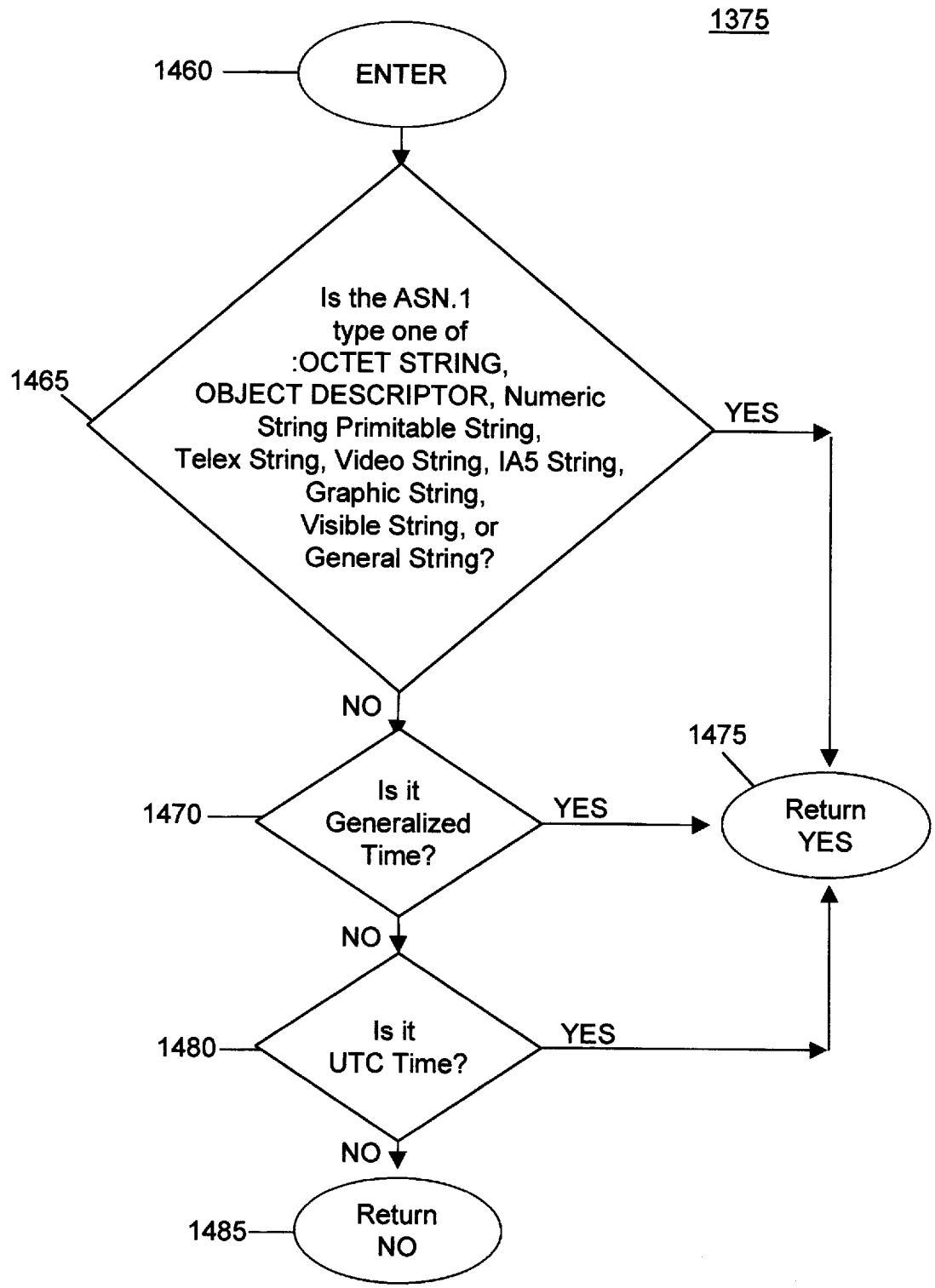
FIG. 28 is a flow chart showing the process of determining whether an attribute's value is of a numeric type as in step 1375 of FIG. 26.

FIG. 28 shows the process of determining whether an ASN.1 type is of string type. This corresponds to step 1375 in FIG. 26. The routine begins at step 1460. In step 1465, it checks if the ASN.1 type is an OCTET STRING or an OBJECT DESCRIPTOR, or a NumericString, or a PrintableString, or a TelexString, or a VideoString, or an IA5String, or a GraphicString, or a VisibleString, or a GeneralString. If it is one of these types, the routine returns an YES. Otherwise, control goes to step 1470 which checks whether the ASN.1 type is a GeneralizedTime (this is represented by a string). If so, the routine returns an YES. If not, step 1480 checks whether the ASN.1 type is a UTCTime (this is represented by a string). If so, the routine returns an YES. Otherwise, the routine returns a NO.

The steps involved in the translation of other CMIP PDUs listed in Section 4 to user's data structures is similar to the steps involved in translating the attributeList of a CMIP CreateArgument to the corresponding user's data structure except for the differences noted below. Translation of data from a user-designed data structure to a CMIP PDU essentially takes the same path, except that the source now is user's data structures and destination is a CMIP PDU.

The attributeList fields in CreateResult, GetResult and SetResult are handled the same way as the attributeList field in the CreateArgument discussed above. Differences in handling the attributes present in other CMIP arguments are listed below.

The GetArgument does not carry attribute-values, but only the attribute-identifiers. Each attribute-identifier present in the attributeIdList field of the GetArgument is represented in the user-designed data structure by turning on the attribute's bit-position in the bit_mask field.

In case of the SetArgument, the attributeId and attributeValue fields of each element of modificationList is handled the same way as the attributeId and attributeValue fields of the elements of the attributeList of the CreateArgument. The elements of modificationList have one additional field called modifyOperator which is an ENUMERATION type that specifies different types of set operations. This information may be mapped to an array of integers which is passed as an additional parameter to the set-PDU translation API. For each bit turned on in the bit_mask, the corresponding element in this array can be set to the modifyOperator value.

In case of the EventReportArgument, the attribute data carried in the eventInfo field of the EventReportArgument can be mapped to the attribute-list of the corresponding logRecord sub-class, as described under the NOTIFICATION template in Section 2. The syntax of the eventInfo field of an EventReportArgument corresponds to the syntax specified for a notification whose object-identifier matches the eventType field of the EventReportArgument. The mapping between different fields in this syntax and attributes is provided by the ATTRIBUTE IDS clause of the NOTIFICATION template. Making use of this information, different fields in the eventInfo field are mapped to their respective attributes, and these attributes are translated into the corresponding fields for the data structures associated with the logRecord sub-class associated with the notification. GDMO does not provide a language-level construct for associating a logRecord sub-class with the related notification. Because of this, a table may be manually built to provide these relationships.

A computer disk can be used to store the code implementation of the configuration and translation methods of this invention described above, and also to store the ASN.1 and GDMO definitions, compilers and meta data. The configuration program can be loaded into computer memory and executed to generate translation tables (MOClassTable, GlobalAttributeTable, and ASN1TypeTable) for use by translator later. When the configuration program is executed in a computer, it can read the meta data, and user's configuration specifications from the disk. The translator library containing routines that implement above discussed translation methods can be linked with user's application code and stored on computer disk. The user's application can be loaded into memory and executed to perform intended tasks, making use of translator library routines to perform translations between CMIP PDUs and user-designed data structures. The translation routines make use of translation tables read from computer disk, to guide the translation process.

I claim:

1. A method for use in a computer to translate data between CMIP PDUs and user-designed data structures, comprising in combination the steps of:

a) providing GDMO definitions to a GDMO compiler to generate GDMO meta data;

b) providing ASN.1 definitions to an ASN.1 compiler to generate ASN.1meta data;

c) loading said GDMO meta data and said ASN.1 meta data into said computer's memory;

d) analyzing said GDMO meta data and said ASN.1 meta data in said computer's memory to generate default configuration specifications for Managed Object classes and attributes present in said GDMO meta data and all ASN.1 data types referenced by said attributes in a first configuration file, wherein said step of generating default configuration specifications further comprises the steps of:

i) creating an MOClassTable in said computer's memory for storing configuration specifications of the Managed Object classes present in said GDMO meta data;

ii) creating a GlobalAttributeTable in said computer's memory for storing the configuration specifications of the attributes belonging to said Managed Object classes;

iii) creating an ASN1TypeTable in said computer's memory for storing the configuration specifications of the ASN.1 types referenced by said attributes;

iv) processing the meta data of each Managed Object class present in said GDMO meta data and populating said MOClassTable, said GlobalAttributeTable and said ASN1TypeTable with Managed Object Class, Attribute and ASN.1 Type configurations, respectively; and v) writing said configuration information from said tables into said first configuration file.

e) allowing the user to modify said configuration file to incorporate his/her preferences on the data structures to be used for representing instances of said Managed Object classes by modifying said generated configuration specifications for said Managed Object classes, attributes belonging to said Managed Object classes and ASN.1 types referenced by said attributes;

f) analyzing said modified configuration specifications for said Managed Object classes, said attributes and said ASN.1 types to generate translation tables, and data structures based on user's preferences as recorded in said modified configuration specifications for storing instance data of said Managed Object classes; and g) performing translations between CMIP PDUs and said user-designed data structures according to said translation tables.

2. The method of claim 1, wherein said step of processing the meta data of a Managed Object class comprises recursively applying for each unconfigured super class of said Managed Object class and for said Managed Object class, the steps of:

a) creating an entry for said Managed Object class in the MOClassTable;

b) generating a structure-name for said Managed Object class by adding a prefix to the name of said Managed Object class, and storing it in said MOClassTable entry;

c) generating a unique integer (localForm) for said Managed Object class, and storing it in said MOClassTable entry; and d) creating a ClassAttributeTable for this Managed Object class, and storing a pointer to it in said MOClassTable entry.

3. The method of claim 2, wherein said step of creating a ClassAttributeTable comprises the steps of:

a) creating a list of all attributes present in all packages of said Managed Object class; and b) for each attribute in said attribute-list, adding entries into said Managed Object class's ClassAttributeTable and GlobalAttributeTable if they do not already exist.

4. The method of claim 3, wherein said step of creating an entry in the GlobalAttributeTable comprises the steps of:

a) adding a new entry for said attribute in the GlobalAttributeTable;

b) generating a unique integer (localForm) for said attribute, and storing it in said GlobalAttributeTable entry;

c) looking up ASN.1 type information for said attribute by traversing a pointer from said attribute's GDMO meta data into a corresponding ASN.1 meta data structure;

d) checking whether configuration information exists for said ASN.1 type in said ASN1TypeTable; and e) copying configuration information from said ASN.1TypeTable entry into said GlobalAttributeTable entry if an ASN1TypeTable entry exists for said ASN.1 type; otherwise, creating a default configuration for said attribute if said ASN.1 type is not primitive, and adding said default configuration to the GlobalAttributeTable; said default configuration contains ASN.1 to C and C to ASN.1 conversion function names derived from appending "_asn2c", and, "_c2asn" to said attribute's name.

5. The method of claim 3, wherein said step of creating an entry for said attribute in the ClassAttributeTable of said Managed Object comprises the steps of:

a) setting a localForm identifier of said for said attribute to the localForm identifier value used in said attribute's GlobalAttributeTable entry;

b) setting a field-name in C structure to the name of said attribute; and c) setting an attribute-label field in said ClassAttributeTable entry to the name of said attribute.

6. A method for use in a computer to translate data between CMIP PDUs and user-designed data structures, comprising in combination the steps of:

a) providing GDMO definitions to a GDMO compiler to generate GDMO meta data;

b) providing ASN.1 definitions to an ASN.1 compiler to generate ASN.1 meta data;

c) loading said GDMO meta data and said ASN.1 meta data into said computer's memory;

d) analyzing said GDMO meta data and said ASN.1 meta data in said computer's memory to generate default configuration specifications for Managed Object classes and attributes present in said GDMO meta data and all ASN.1 data types referenced by said attributes in a first configuration file, e) allowing the user to modify said configuration file to incorporate his/her preferences on the data structures to be used for representing instances of said Managed Object classes by modifying said generated configuration specifications for said Managed Object classes, attributes belonging to said Managed Object classes and ASN.1 types referenced by said attributes;

f) analyzing said modified configuration specifications for said Managed Object classes, said attributes and said ASN.1 types to generate translation tables, and data structures based on user's preferences as recorded in said modified configuration specifications for storing instance data of said Managed Object classes, wherein said step of analyzing modified configuration specifications and generating translation-tables comprises the steps of:

i) reading each configuration specification from the modified configuration file;

ii) creating an entry in said MOClassTable if said configuration specification is a CLASS specification;

iii) creating an entry in said GlobalAttributeTable if said configuration specification is an ATTRIBUTE specification; and iv) creating an entry in said ASN.1TypeTable if said configuration specification is a TYPE specification and g) performing translations between CMIP PDUs and said user-designed data structures according to said translation tables.

7. The method of claim 6, wherein said step of creating an entry in said MOClassTable for said CLASS specification comprises the steps of:

a) creating a new entry in said MOClassTable;

b) retrieving a Managed Object class name in said CLASS specification;

c) retrieving the localForm identifier in said CLASS specification, and storing said localForm identifier in said MOClassTable entry;

d) verifying that said localForm identifier for said Managed Object class is not already used for another Managed Object class's entry;

e) retrieving C Structure Name for said Managed Object class from the DATA-TYPE specification of said CLASS specification, and storing it in said MOClassTable entry;

f) obtaining size of said C structure by using sizeof( ) operator and storing it in said MOClassTable entry;

g) retrieving the attribute-name and field-name pairs from the ATTRIBUTES specification of said CLASS specification;

h) verifying that no entry for this class already exists in said MOClassTable;

i) creating a ClassAttributeTable entry and storing a pointer to said ClassAttributeTable entry in said MOClassTable entry;

j) for each attribute-name, field-name pair read from said ATTRIBUTES specification of said CLASS specification, adding an entry to said ClassAttributeTable entry; and k) obtaining an offset of said attribute-name in said C structure by using offsetof( ) macro and storing it in said ClassAttributeTable entry.

8. The method of claim 6, wherein said step of creating an entry in said GlobalAttributeTable for said ATTRIBUTE specification comprises the steps of:

a) creating a new entry in said GlobalAttributeTable;

b) retrieving the attribute name in said ATTRIBUTE specification;

c) retrieving the localForm identifier in the ATTRIBUTE specification;

d) verifying that said localForm identifier is not already used for any other entry in said GlobalAttributeTable;

e) storing said localForm identifier in said GlobalAttributeTable entry;

f) retrieving a choice member name specified in CHOICE-PICKED specification, if such specification exists, and storing said choice member name in said GlobalAttributeTable entry;

g) retrieving an array-size specified in ARRAY-SIZE specification, if such specification exists, and storing said array-size in said GlobalAttributeTable entry;

h) retrieving the ASN-to-C conversion function name specified in ASN2C specification, if such specification exists, and storing said ASN-to-C conversion function name in said GlobalAttributeTable entry; and i) retrieving the C-to-ASN conversion function name specified in C2ASN specification, if such specification exists, and storing said C-to-ASN conversion function name in said GlobalAttributeTable entry.

9. The method of claim 6, wherein said step of creating an entry in said ASN1TypeTable for said TYPE specification comprises the steps of:

a) creating a new entry in said ASN1TypeTable;

b) retrieving an ASN.1 type name in said TYPE specification c) retrieving a choice member name specified in CHOICE-PICKED specification, if such specification exists, and storing said choice member name in said ASN1TypeTable entry;

d) retrieving the array-size specified in ARRAY-SIZE specification, if such specification exists, and storing said array-size in said ASN1TypeTable entry;

e) retrieving the ASN-to-C conversion function name specified in ASN2C specification, if such specification exists, and storing said ASN-to-C conversion function name in said ASN1TypeTable entry; and f) retrieving the C-to-ASN conversion function name specified in C2ASN specification, if such specification exists, and storing said C-to-ASN conversion function name in said ASN1TypeTable entry.

10. A method for use in a computer to translate data between CMIP PDUs and user-designed data structures, comprising in combination the steps of:

a) providing GDMO definitions to a GDMO compiler to generate GDMO meta data;

b) providing ASN.1 definitions to an ASN.1 compiler to generate ASN.1 meta data;

c) loading said GDMO meta data and said ASN.1 meta data into said computer's memory;

d) analyzing said GDMO meta data and said ASN.1 meta data in said computer's memory to generate default configuration specifications for Managed Object classes and attributes present in said GDMO meta data and all ASN.1 data types referenced by said attributes in a first configuration file;

e) allowing the user to modify said configuration file to incorporate his/her preferences on the data structures to be used for representing instances of said Managed Object classes by modifying said generated configuration specifications for said Managed Object classes, attributes belonging to said Managed Object classes and ASN.1 types referenced by said attributes;

f) analyzing said modified configuration specifications for said Managed Object classes, said attributes and said ASN.1 types to generate translation tables, and data structures based on user's preferences as recorded in said modified configuration specifications for storing instance data of said Managed Object classes; and g) performing translations between CMIP PDUs and said user-designed data structures according to said translation tables, wherein said step of performing translations from a CMIP PDU to said user-designed data structure comprises the steps of:
   i) retrieving the Managed Object Class information from CMIP PDU;
   ii) locating an entry for said Managed Object class in said MOClassTable using said Managed Object Class Information;
   iii) retrieving size of the C data structure from said MOClassTable entry;
   iv) creating a C data structure of said size; and
   v) for each attribute included in said CMIP PDU, and translating said attribute's information into desired C data type, and storing the C value at appropriate location in said C structure created above.

11. The method of claim 10, wherein said step of translating said attribute information in said CMIP PDU to desired C data type, and storing said C value comprises the steps of:
   a) retrieving said attribute's GlobalAttributeTable entry;
   b) checking whether ASN-to-C conversion function name exists in said attribute's entry in said GlobalAttributeTable;
   c) locating the entry for said attribute in said Managed Object class's ClassAttributeTable;
   d) retrieving the offset of said attribute in said Managed Object class's C structure from said ClassAttributeTable entry;
   e) if said ASN-to-C conversion function exists, invoking said ASN-to-C conversion function, passing it said attribute-value in said CMIP PDU, and a pointer to a position in said C structure offset by said offset-value;
   f) if said ASN-to-C conversion function does not exist, copying the attribute-value in CMIP PDU by copying primitive data values directly to a position that is at said offset bytes distance from the beginning of said C structure;
   g) obtaining the index of said attribute's entry in said ClassAttributeTable, and setting a bit in the bit_mask field to 1 to indicate that said field in C data structure is initialized with a value from said CMIP PDU. Said bit-position in bit-mask is same as said index value; and
   h) if said CMIP PDU is a GetArgument, only attribute-identifiers, but no attribute-values would be present in said CMIP PDU; in this case only the bit_mask field in the C structure would be updated, and no attribute-value translation takes place.

12. A method for use in a computer to translate data between CMIP PDUs and user-designed data structures, comprising in combination the steps of:
   a) providing GDMO definitions to a GDMO compiler to generate GDMO meta data;
   b) providing ASN.1 definitions to an ASN.1 compiler to generate ASN.1 meta data;
   c) loading said GDMO meta data and said ASN.1 meta data into said computer's memory;
   d) analyzing said GDMO meta data and said ASN.1 meta data in said computer's memory to generate default configuration specifications for Managed Object classes and attributes present in said GDMO meta data and all ASN.1 data types referenced by said attributes in a first configuration file;
   e) allowing the user to modify said configuration file to incorporate his/her preferences on the data structures to be used for representing instances of said Managed Object classes by modifying said generated configuration specifications for said Managed Object classes, attributes belonging to said Managed Object classes and ASN.1 types referenced by said attributes;
   f) analyzing said modified configuration specifications for said Managed Object classes, said attributes and said ASN.1 types to generate translation tables, and data structures based on user's preferences as recorded in said modified configuration specifications for storing instance data of said Managed Object classes; and
   g) performing translations between CMIP PDUs and said user-designed data structures according to said translation tables, wherein said step of performing translations from said user-designed data structure to a CMIP PDU comprises the steps of:
      i) retrieving the Managed Object Class information from a user-provided parameter that identifies Managed Object Class associated with said user data structure;
      ii) locating the entry for said Managed Object class in said MOClassTable using said Managed Object class Information;
      iii) retrieving said Managed Object Class's ClassAttributeTable entry by following ClassAttributeTablePointer in said MOClassTable entry;
      iv) creating an instance of said CMIP PDU's type; and
      v) retrieving bit-mask information from said user data structure, and for each bit in the bit-mask with a value of one, noting index of said bit, and identifying corresponding attribute by looking up an entry at said index position in said ClassAttributeTable entry, and creating an entry for said attribute in CMIP PDU.

13. The method of claim 12, wherein said step of creating an entry for said attribute value in said CMIP PDU from said user C data structure comprises the steps of:
   a) retrieving offset of said attribute in said Managed Object class's C structure from said ClassAttributeTable entry;
   b) retrieving said attribute's GlobalAttributeTable entry;
   c) retrieving said attribute's AttributeInfo structure from said GlobalAttributeTable entry;
   d) creating and adding an attribute-entry consisting of attributeId and attributeValue fields;
   e) copying object-identifier of said attribute from said AttributeInfo structure to said attributeId field of said attribute-entry in said CMIP PDU;
   f) retrieving said attribute's ASN.1 type information from said AttributeInfo structure;
   g) creating an instance of said ASN.1 type;
   h) checking whether C-to-ASN conversion function name exists in said attribute's entry in said GlobalAttributeTable;
   i) if said C-to-ASN conversion function exists, invoking said C-to-ASN conversion function, passing it a pointer to said attribute's location in said C structure by adding said offset value to a pointer to said C structure;
   j) if said C-to-ASN conversion function does not exist, copying primitive attribute-value at said attribute's location in C structure to said attributeValue field in said attribute-entry in said CMIP PDU; and
   k) if said CMIP PDU is a GetArgument, only attribute-identifiers, but no attribute-values would be set in said attribute-entry in said CMIP PDU, using said bit-index information in the C structure would be used to set attribute-identifier fields.

* * * * *